(12) United States Patent
Jones

(10) Patent No.: US 9,111,312 B2
(45) Date of Patent: Aug. 18, 2015

(54) BEVERAGE DISPENSING AND TRACKING SYSTEM

(71) Applicant: iPourlt, Inc., Santa Ana, CA (US)

(72) Inventor: Brett Michael Kaiakua Jones, Santa Ana, CA (US)

(73) Assignee: iPourlt, Inc., Lake Forest ( * ) Notice: Subject to any disclaimer, the term of this patent is extended or adjusted under 35 U.S.C. 154(b) by 0 days.

(21) Appl. No.: 14/516,245

(22) Filed: Oct. 16, 2014

(65) Prior Publication Data

US 2015/0032555 A1 Jan. 29, 2015

Related U.S. Application Data

(63) Continuation of application No. 13/686,467, filed on Nov. 27, 2012, now Pat. No. 8,880,427.

(60) Provisional application No. 61/564,187, filed on Nov. 28, 2011, provisional application No. 61/564,183, filed on Nov. 28, 2011.

(51) Int. Cl.
| | |
|---|---|
| G06Q 20/00 | (2012.01) |
| G06F 21/00 | (2013.01) |
| G06Q 30/06 | (2012.01) |
| G06Q 10/08 | (2012.01) |
| G07F 17/00 | (2006.01) |
| B67D 7/22 | (2010.01) |
| B67D 7/32 | (2010.01) |
| G06Q 50/12 | (2012.01) |
| H04W 4/00 | (2009.01) |

(52) U.S. Cl.
CPC ............ *G06Q 30/0635* (2013.01); *B67D 7/221* (2013.01); *B67D 7/3281* (2013.01); *G06Q 10/087* (2013.01); *G06Q 50/12* (2013.01); *G07F 17/00* (2013.01); *H04W 4/008* (2013.01); *Y10T 16/1867* (2015.01)

(58) Field of Classification Search
USPC .......................................................... 705/22
See application file for complete search history.

(56) References Cited

U.S. PATENT DOCUMENTS

| | | | |
|---|---|---|---|
| 4,894,647 | A | 1/1990 | Walden, Jr. et al. |
| 5,412,547 | A | 5/1995 | Hornblad et al. |

(Continued)

FOREIGN PATENT DOCUMENTS

| | | |
|---|---|---|
| GB | 2364818 | 2/2002 |
| WO | 96/16894 | 6/1996 |

(Continued)

OTHER PUBLICATIONS

DraftServe Technologies, Webpage captures as of Aug. 21, 2010, retrieved from www.draftserv.com.

(Continued)

*Primary Examiner* — Peter L Ludwig
(74) *Attorney, Agent, or Firm* — Fish & Tsang LLP

(57) ABSTRACT

A system for managing beverage sales and inventory, and for enabling customers to pour their own beverages while preventing shrinkage is disclosed. The system enables a user to access a beverage from a beverage dispenser by presenting a beverage-pour tracking device. The beverage dispenser can prevent a user from accessing the beverage without the beverage-pour tracking device. Further, the system can confirm whether the user is permitted to access the beverage dispenser before enabling the user to access the dispenser.

18 Claims, 13 Drawing Sheets

(56) References Cited

U.S. PATENT DOCUMENTS

| | | |
|---|---|---|
| 5,586,691 A | 12/1996 | Gotch et al. |
| D396,994 S | 8/1998 | Carrino |
| 5,908,142 A | 6/1999 | Sacchetti |
| 7,096,617 B2 | 8/2006 | Bydalek et al. |
| 7,931,382 B2 | 4/2011 | Hecht |
| 8,011,123 B2 | 9/2011 | Ferris |
| 2003/0071725 A1 | 4/2003 | Teller |
| 2004/0261624 A1 | 12/2004 | Lassota |
| 2005/0029309 A1 | 2/2005 | Forsyth |
| 2006/0226250 A1 | 10/2006 | Elliott et al. |
| 2007/0145651 A1 | 6/2007 | Heaslip et al. |
| 2008/0179146 A1 | 7/2008 | Sullivan |
| 2009/0125457 A1 | 5/2009 | Farhan et al. |
| 2011/0298583 A1 | 12/2011 | Libby et al. |
| 2012/0047147 A1 | 2/2012 | Redstone et al. |

FOREIGN PATENT DOCUMENTS

| | | |
|---|---|---|
| WO | 2007/145651 | 12/2007 |
| WO | 2012/168799 | 12/2012 |

OTHER PUBLICATIONS

Swedberg, C., "Wall of Beer Lets Patrons Draw Their Drinks", RFID Journal, Jul. 28, 2011.
RFID Case Study, "Brewing up better sales and service", Tavern Restaurant Group, Jul. 20, 2011.
"Beer Tap Handles with led writing board", http://www.alibaba.conn/product-gs/634686389/Beer_Tap_Handles_with_led_writing.html, screen capture Feb. 12, 2013.
"Wooden Illuminated Beer Rap Handel", http://alibaba.com/product-gs/633862132/Wooden_Beer_Tap_Handle.html, screen capture Feb. 12, 2013.
Ellickson USA, Webpage captures as of Jan. 8, 2013, retrieved from www.ellicksonusa.com.

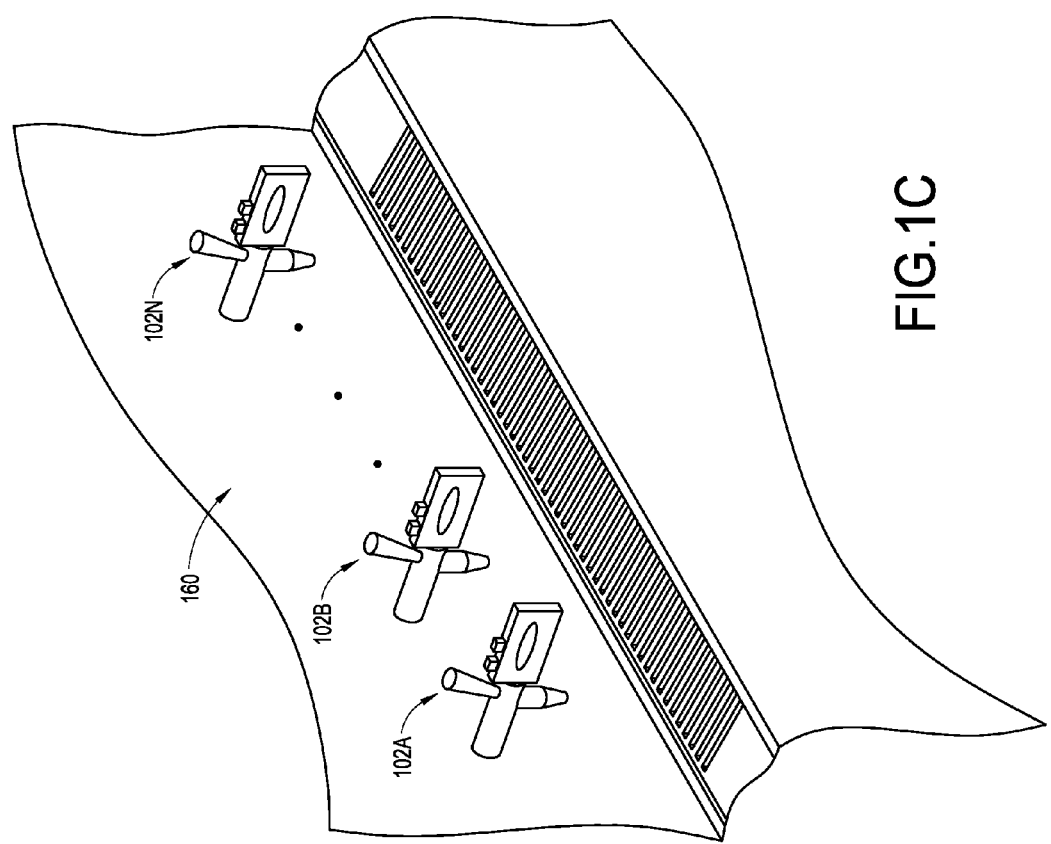

FIG. 10

BAR NONE
1979 ARISTA ST.
SOME TOWN, CA
HRS: S-S 9:00-2:00

FRIENDS
JANE SMYTH ●
JOHN SMYTH ○
WILD BILLS ●
STONE COLD ○
MARY COREN ○

DRINK MENU
STONE COLD SUMMER BREW $0.35 / FL. OZ.
BLACK WIDOW ALE $0.37 / FL. OZ.
OLD CHEAPO ALE $0.20 / FL. OZ.
THE GOOD STUFF $0.65 / FL. OZ.
SODA/JUICE $0.10 / FL. OZ.

CHECK-INS
JOHN SMYTH CHECKED IN AT 23:18
JANE SMYTH CHECKED IN AT 23:18
ALICE HARE CHECKED IN AT 23:15
WILHELM GOETHE CHECKED IN AT 23:11
NIKOS KAVLIDES CHECKED IN AT 23:00
LYNDA LEE CHECKED IN AT 22:47

LIVE BAND EVERY FRIDAY AND SATURDAY
THIS FRIDAY: SEVEN CENTIMETER SCREWS
THIS SATURDAY: THE LOCAL BAND

FOOTBALL SUNDAY
50 TELEVISIONS
EVERY GAME
PERSONAL SPEAKER BOXES AVAILABLE – FIRST COME FIRST SERVED

KEGS TAPPED IN THE LAST HOUR
STONE COLD SUMMER BREW – 23:19
BLACK WIDOW WHEAT BEER – 23:10
BLACK WIDOW CIDER – 23:05
GANDALF'S FINEST MAGIC BREW – 22:55
OLD CHEAPO ALE – 22:43
THREE-LEGGED DOG – 22:30
IRONSIDE LAGER – LIGHT – 22:23

SPECIALS: BUY 128 FL. OZ. OF ANY DRAUGHT BEER AND GET A FREE APPETIZER

10% OFF IRONSIDE LAGER AND IRONSIDE LAGER LIGHT

INVENTORY

| | STOCK | RESERVABLE |
|---|---|---|
| STONE COLD SUMMER BREW | 3.5 KEGS | SOLD OUT |
| GANDALF'S FINEST MAGIC BREW | 4.2 KEGS | YES |
| BLACK WIDOW CIDER | 1.2 KEGS | NO |

RESERVE A BEVERAGE
LOCATION: ARISTA ST.
BEVERAGE: WITCHES' BREW
QUANTITY: 32 FL OZ
[RESERVE]

RESERVATION STATUS
RESERVATION SUCCESSFUL
PLEASE REDEEM WITHIN 60 DAYS

GIFT A BEVERAGE
FRIEND: RON YELSKI
LOCATION: ARISTA ST.
BEVERAGE: THREE-LEGGED DOG
QUANTITY: 32 FL OZ
☒ ANONYMOUS
PRICE: $15.00
[GIFT]

FIG. 11

CUSTOMER SEARCH PAGE

1102:
- CHARACTERISTIC [LAGER ▼] [REMOVE] 1110
- 1112

1104:
- CHARACTERISTIC [IMPORTS ▼] [REMOVE] 1110
- REGION [EUROPE ▼] COUNTRY [ANY ▼] [REMOVE] 1116 [ADD] 1114
- REGION [ASIA ▼] COUNTRY [JAPAN ▼] [REMOVE] 1116
- 1112

1106:
- CHARACTERISTIC [5-7% ALCOHOL ▼] [REMOVE] 1110 [ADD] 1108
- 1112

1120:
- ADDRESS [1979 ARISTA ST., SOME TOWN, CA]
- DISTANCE: WITHIN [25] MILES

[SEARCH] 1122

RESULTS

- TOTAL POTENTIAL CUSTOMERS [7,345]
- CUSTOMERS WHO HAVE VISITED ESTABLISHMENT [1,551]
- CUSTOMERS WHO HAVE VISITED ESTABLISHMENT IN PAST YEAR [844]
- AVERAGE SPENT BY MATCHING POTENTIAL CUSTOMERS PER VISIT [$37.45]

1130

SPECIAL 1132:
15% OFF ALL LAGERS FROM EUROPE AND JAPAN LIMITED TO 5-7% ALCOHOL BY CONTENT BEVERAGES

POST SPECIAL TO: 1134
- ☒ ALL    ☐ HAVE VISITED ESTABLISHMENT
- ☐ HAVE VISITED ESTABLISHMENT IN PAST YEAR

POST SPECIAL VIA: 1136
- ☒ EMAIL                    ☒ TXT MSG
- ☒ CUSTOMER PROFILE PAGE    ☒ ESTABLISHMENT PROFILE PAGE

[POST] 1138

1100

BEVERAGE DISPENSING AND TRACKING SYSTEM

This application is a continuation of U.S. patent application Ser. No. 13/686,467, filed Nov. 27, 2012, which claims the benefit of priority to U.S. Provisional Application Nos. 61/564,183 and 61/564,187, both filed Nov. 28, 2011. U.S. patent application Ser. No. 13/686,467 and U.S. Provisional Application Nos. 61/564,183 and 61/564,187 are expressly incorporated by reference herein in their entirety.

FIELD OF THE INVENTION

The present disclosure relates to a system and method for dispensing beverages and for tracking inventory and sales information of the beverages at one or more beverage providers.

BACKGROUND OF THE INVENTION

Many beverage providers, such as bars, sell a number of different beverages. Often, each of these beverages will be stored in a beverage dispenser that includes a container, such as a keg, and a dispensing mechanism, such as a tap. When a customer orders a quantity of the beverage (e.g., a pint of beer), an employee (e.g., a bartender) of the beverage provider will pour the beverage (e.g., dispense the beverage from a tap into a glass) for the customer. After pouring the beverage, the bartender will usually charge the customer for the beverage and, in most cases, the customer will pay for the beverage.

Typically, the bartender determines that a container of the beverage is empty when the dispensing mechanism stops dispensing the beverage. At this point, the bartender can replace the container with a new container, if one is available.

SUMMARY OF THE INVENTION

For purposes of summarizing the disclosure, certain aspects, advantages and novel features of the inventions have been described herein. It is to be understood that not necessarily all such advantages may be achieved in accordance with any particular embodiment of the inventions disclosed herein. Thus, the inventions disclosed herein may be embodied or carried out in a manner that achieves or optimizes one advantage or group of advantages as taught herein without necessarily achieving other advantages as may be taught or suggested herein.

Certain embodiments described herein include a method for tracking beverage pours. In some cases, the method may be performed by computer hardware including one or more processors. The method can include receiving a unique identifier from a customer of a first beverage provider. Further, the method may include associating the customer with a first central account at a multi-site beverage-data system based, at least in part, on the unique identifier. The multi-site beverage-data system may be accessible by a plurality of beverage providers including the first beverage provider. In addition, the method can include associating the customer with a customer account at a site-specific beverage tracking system based at least in part on the unique identifier. Moreover, the method may involve associating the customer with a beverage-pour tracking device. The beverage-pour tracking device can store information for identifying the customer account associated with the customer at the site-specific beverage tracking system. In addition, the method may include determining whether the beverage-pour tracking device is within a threshold distance from a first activator associated with a first beverage dispenser of a plurality of beverage dispensers. Each beverage dispenser of the plurality of beverage dispensers may be associated with a separate activator. In response to determining that the beverage-pour tracking device is within the threshold distance from the first activator, the method can include identifying the customer based on the information stored on the beverage-pour tracking device and determining whether a measure of an amount of a first beverage available at the first beverage provider satisfies a minimum available beverage threshold. Moreover, in response to determining that the measure of the amount of the first beverage available satisfies the minimum available beverage threshold, the method can include activating the first beverage dispenser thereby enabling the customer to obtain access to the beverage. Further, the method may include determining pour information indicating a quantity of the first beverage poured from the first beverage dispenser. In some cases, the method includes updating a first set of metadata associated with the first beverage at an inventory repository, updating the customer account at the site-specific beverage-tracking system based, at least in part, on the pour information, and updating customer information associated with the first central account at the multi-site beverage-data system based, at least in part, on the pour information.

Some embodiments described herein include a system for tracking beverage pours. The system can include an identification reader configured to read an identification associated with a first customer of a first beverage provider and to determine a unique identifier for the first customer based, at least in part, on the identification. Further, the system can include a beverage dispenser configured to dispense a beverage and a site-specific beverage tracking system configured to track a quantity of the beverage poured from the beverage dispenser when the beverage dispenser is activated. In addition, the system may include an activator associated with the beverage dispenser. In some cases, the beverage dispenser is one of a plurality of beverage dispensers and each beverage dispenser is associated with a separate activator. Moreover, the system can include a beverage-pour tracking device configured to store a tracking device identifier. The tracking device identifier may be associated with the first customer at the site-specific beverage tracking system based, at least in part, on the unique identifier. In certain embodiments, the activator is configured to access the tracking device identifier and to initiate an activation request to activate the beverage dispenser when the beverage-pour tracking device is within a threshold distance from the activator. The system may also include a multi-site beverage-data system configured to maintain a set of accounts. At least a subset of the accounts may be associated with a set of customers. Further, the multi-site beverage-data system may be further configured to associate the first customer with a first account from the set of accounts based on the unique identifier. In addition, the system may include an inventory repository configured to store metadata associated with the beverage. In some embodiments, the site-specific beverage tracking system is further configured to update the metadata associated with the beverage at the inventory repository, and to update customer information associated with the first account at the multi-site beverage-data system based, at least in part, on the beverage poured from the beverage dispenser.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

FIG. 1C illustrates an example of a plurality of beverage dispensers installed at a beverage provider.

FIG. 10 illustrates an example profile page for a beverage provider at a beverage-based social networking site.

FIG. 11 illustrates an example of a query page for searching data stored at a multi-site beverage-data system.

DETAILED DESCRIPTION

Introduction

Figure 1A:
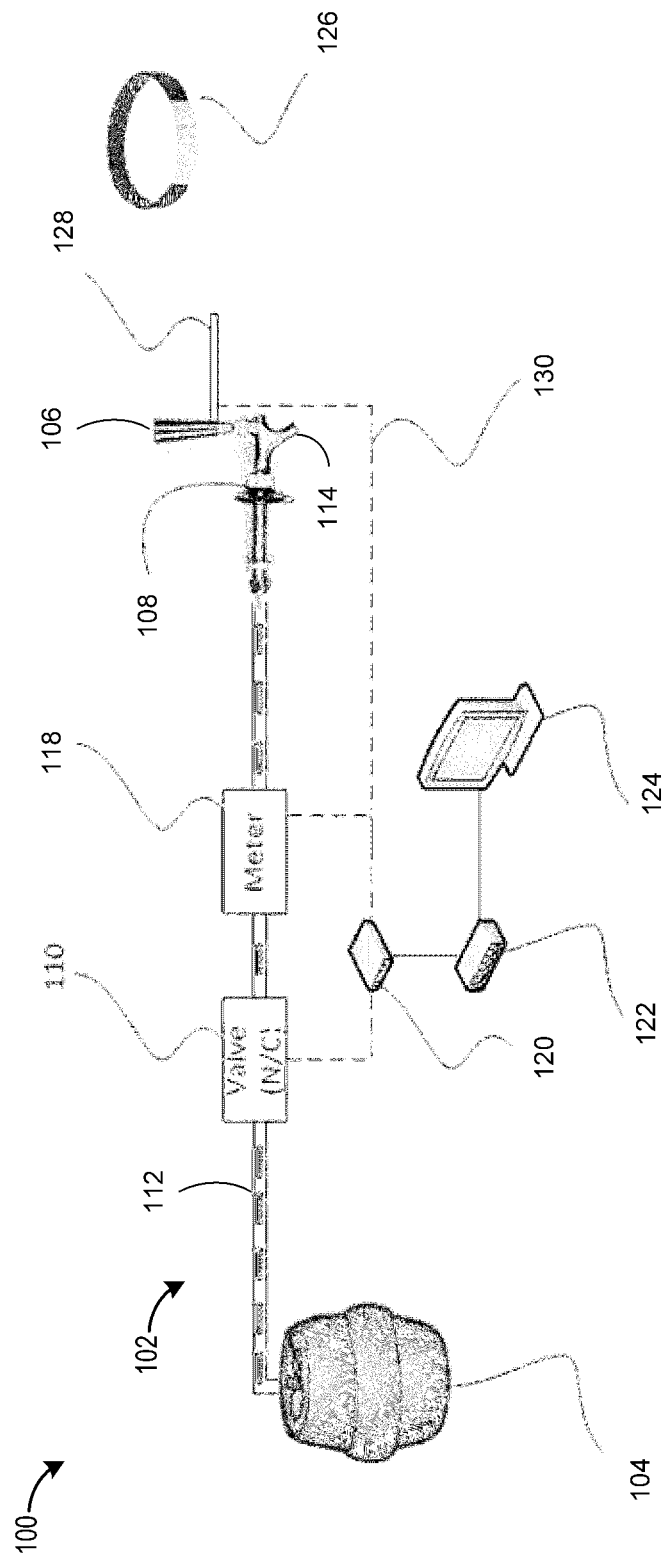
FIG. 1A is a diagram illustrating an example of a beverage dispensing system for a single beverage dispenser.

Often, a beverage provider (e.g., a bar, pub, restaurant, stadium vendor, etc.) will lose or suffer shrinkage of a percentage of beverage within a beverage container (e.g., a keg, a cask, etc.) due to a number of shrinkage factors. These shrinkage factors may include, for example, employees drinking the merchandise, employees giving away merchandise (e.g., to friends), spillage; pouring foam off the top, and the like. It is not unusual for a beverage provider to suffer shrinkage of excess of 25% of a beverage container. Although not limited as such, to simplify discussion, this disclosure will generally describe embodiments assuming a multi-serving beverage container (e.g., a keg that can fill dozens of glasses). However, as will be described, because users in some embodiments can control the amount of beverage poured, it is possible in some cases for the beverage container to be a single serving container that can be shared among multiple users.

The present disclosure introduces a system for managing beverage sales and inventory, and for enabling customers to pour their own beverages while preventing shrinkage. The system includes a beverage dispenser that enables a user, such as a bartender or a customer of a beverage provider, to access a beverage from the beverage dispenser by presenting a beverage-pour tracking device. In most cases, the beverage dispenser will prevent a user from accessing the beverage without the beverage-pour tracking device, and in some cases, without first confirming whether the user is permitted to access the beverage dispenser. As will be described herein, the beverage-pour tracking device can include any device that can be used to identify the user attempting to pour the beverage from the beverage provider including, for example, a Radio Frequency Identifier (RFID) device. Advantageously, in certain embodiments, by requiring the user to be identified before pouring a beverage, a beverage provider can more accurately track who is accessing the beverage dispenser compared to systems that do not limit access to the beverage dispenser.

Furthermore, the beverage dispenser can include a meter that monitors the amount of beverage poured by the user who is accessing the beverage dispenser. The meter can monitor the flow of beverage from the beverage dispenser using any flow resolution. For example, the meter can monitor each fluid ounce, each half fluid ounce, or each quarter fluid ounce poured. Advantageously, in certain embodiments, by identifying which user is pouring a beverage and how much of the beverage the user is pouring, shrinkage can be greatly reduced and in some cases, eliminated. For example, bartenders will no longer be able to give away free drinks. As a second example, pour-off to reduce the level of foam in a glass or overflow from, for example, an inattentive bartender can be measured and charged to the customer or deducted from the bartender's wages.

In addition, in certain embodiments, customers can pour their own beverage. In such cases, the beverage provider can identify the beverage poured and how much of the beverage was poured by identifying the pourer via the beverage-pour tracking device and the quantity poured via the meter of the beverage dispenser. Advantageously, in certain embodiments, users who can pour their own beverage may be incentivized to pour more beverages because, for example, access to the beverage is simpler than finding an available bartender, grabbing the bartender's attention, and waiting for the bartender to fill the order.

A provider of a system for enabling a beverage provider to accurately monitor who pours beverages and how much is poured can monetize the system by charging a one-time fee, or by charging per ounce poured. For example, the charge could be a penny per ounce poured, which can be determined by way of the previously mentioned meter.

Further, the system can include a repository for storing inventory information and/or information associated with the beverage provider's customers, such as how much beverage they poured. By storing this information, a data mining component of the system can help determine what beverages are selling well, how much to order, what particular customers like to drink, and any other information that may be useful for the beverage provider to increase sales.

In some implementations, the system can include a multi-site based beverage monitoring system that enables multiple locations of a beverage provider and/or multiple beverage providers to share data regarding customers and/or inventory. Sharing the data enables beverage providers to better serve their customers by, for example, identifying various customers' preferences, or the preferences of a subset of customers, and catering to the preferences by, for example, offering specials on beverages or products that appeal to the customers.

In addition, in some embodiments, the system can include a social networking system that enables users to discuss beverages, identify what beverages are in stock at a beverage provider, learn about beverage specials, reserve beverages at a beverage provider, and/or perform any other social network based action related to beverages and/or beverage providers. Further, beverage providers can use the social network to help advertise specials and upcoming events that are of interest to their customers. Moreover, the beverage providers can search data maintained by the social networking system, repositories of the system and/or multi-site based beverage monitoring system to determine how many potential customers may be interested in a special offer. The beverage provider, or an employee thereof, can then determine whether to modify the special offer based on the result of the search.

Although any measurement unit can be used for beverages, for simplicity, the present disclosure will describe everything in ounces or fluid ounces. Further, unless clear from the context, the term "beverage provider" may refer to an establishment or organization that offers beverages, or may refer to an employee or owner thereof.

Example Beverage Dispensing System

FIG. 1A is a diagram illustrating an example of a beverage dispensing system 100 for a beverage dispenser 102. Although a single beverage dispenser 102 is illustrated, the beverage dispensing system 100 can include one or more beverage dispensers. The beverage dispenser 102 is designed to dispense a beverage to a user, whether it is a customer or an employee of a beverage provider. Although a single beverage dispenser 102 is illustrated, the beverage dispensing system 100 can include a plurality of beverage dispensers. The beverage dispenser 102 illustrated in FIG. 1A is just one example of a design for a beverage dispenser. Any number of designs that enable a user to pour a measure of the beverage contained by the beverage dispenser are possible.

In the example of FIG. 1A, the beverage dispenser 102 includes a container 104 (e.g., a keg, a barrel, a jug, a box, etc.) that contains a beverage for dispensing to a user (e.g., a customer, a bartender, a waiter, etc.). The type of beverage that the container 104 can include is generally not limited. For example, the beverage can include, wine, beer, juice, soda, cocktails, etc. When the beverage dispenser 102 is activated by, for example, activating a tap handle 106 on a shank 108, a valve 110 is opened enabling the beverage in the container 104 to flow along a pipe 112 to a spout 114. A meter 118 along the pipe 112 can measure the amount of beverage poured. In some cases, the meter 118 may be positioned substantially near the exit from the container 104 to more accurately measure the amount of beverage in the container 104. In other cases, the meter 118 may be positioned substantially near the spout 114 to more accurately measure the amount of beverage poured from the spout 114. Regardless of the position of the meter 118 along the pipe 112, the meter 118 can be calibrated to account for beverage in the pipe 112.

In some cases, container 104 may include one or more ingredients of a beverage that can be combined with additional ingredients from one or more additional sources (not shown) to create the beverage. These additional sources can include, for example, an additional container, a tap (e.g., a water tap), a CO2 dispenser, and the like. The additional ingredients may be piped separately and combined at the spout 114 or in the customer's cup or glass. Alternatively, the ingredients of the container 104 and the one or more additional sources of ingredients may share the pipe 112 causing the ingredients to be combined as the ingredients travel along the pipe 112.

Figure 2:
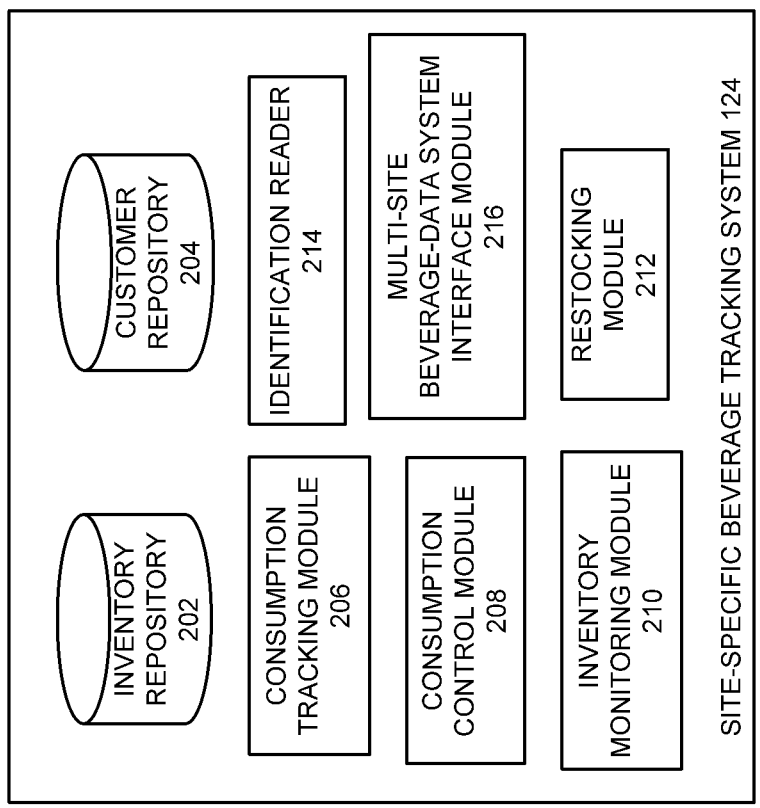
FIG. 2 illustrates an example of a site-specific beverage tracking system.

In addition to the beverage dispenser 102, the beverage dispensing system 100 can include a controller system 120, a local network 122, a site-specific beverage tracking system 124, which is described in more detail with respect to FIG. 2, and a beverage-pour tracking device 126. Further, the beverage dispensing system 100 can include a tap activator 128, which in some cases may be part of the beverage dispenser 102. The activator, or tap activator 128, can initiate a beverage pour process in response accessing or reading the beverage-pour tracking device 126. The beverage pour process is described further with respect to FIG. 5 below. As will be described further below, each customer of a beverage provider can be allocated a beverage-pour tracking device 126. Generally, the allocation of the beverage-pour tracking device 126 is temporary. However, in some cases, a beverage pour tracking device 126 can be allocated on a permanent or semi-permanent basis.

Generally, the beverage-pour tracking device 126 includes a Radio Frequency Identifier (RFID) that when brought within a threshold distance of the tap activator 128 can be read or accessed by the tap activator 128. However, it is possible for the beverage-pour tracking device 126 to include alternative or additional technology that can cause the tap activator 128 to initiate the beverage pour process. For example, the beverage-pour tracking device 126 can include a Near Field Communication (NFC) device that can be accessed by the tap activator 128. As a second example, the beverage-pour tracking device 126 can be a mobile device, such as a cell phone, smartphone, or tablet, to name a few. In some cases, the beverage pour tracking device 126 can present a machine-readable code, such as a barcode or QR code, that can be accessed by the tap activator 128.

When the tap activator 128 detects the presence of the beverage-pour tracking device 126, the tap activator 128 accesses the beverage-pour tracking device 126 and reads an identifier stored on the beverage-pour tracking device 126. Typically, the beverage-pour tracking device 126 does not store any additional information beyond the identifier, such as personal information of the customer. Advantageously, in certain embodiments, because the beverage-pour tracking device 126 only stores a unique random identifier, the beverage-pour tracking device 126 cannot be forged. Further, if a customer loses or removes the beverage-pour tracking device 126, information regarding the beverages the customer has poured is not lost because, for example, the identity of beverages poured and the quantity of beverage poured may be stored at the site-specific beverage tracking system 124 in one or more repositories that are described further below with respect to FIG. 2.

The identifier may be provided to the controller system 120 either via a wire 130, or wirelessly. The controller system 120 can include any system that can determine whether to activate the beverage dispenser 102 based on one or more activation factors. These activation factors can include an amount of beverage remaining in the container 104, whether a customer has available credit, whether the customer has reached a maximum pour quantity limit, and the like. Further, the controller system 120 can include any system that can enable the beverage dispenser 102 to dispense the beverage in response to one or more of the activation factors being satisfied. Enabling the beverage dispenser 102 to dispense the beverage can include activating or opening the valve 110. Further, enabling the beverage dispenser 102 to dispense the beverage can include enabling the tap handle 106 to be actuated such that the spout 114 can be opened.

To determine whether one or more of the activation factors are satisfied, the controller system 120 can access information associated with the beverage dispenser 102 and information associated with the customer at the site-specific beverage tracking system 124. The controller 120 can communicate with the site-specific beverage tracking system 124 via the local network 122, which can include any type of wired or wireless network including a LAN, WAN, Ethernet, etc. The information associated with the beverage dispenser 102 can include the amount of beverage remaining in the beverage dispenser 102, or the container 104 of the beverage dispenser 102, the type of beverage, an amount of the beverage that has been reserved, an amount of additional stock of the beverage in inventory (e.g., additional containers 104), etc. The information associated with the customer can include pre-paid credits remaining, a number of ounces before the customer reaches a maximum pour quantity limit, beverage reservation information, etc.

Figure 1B:
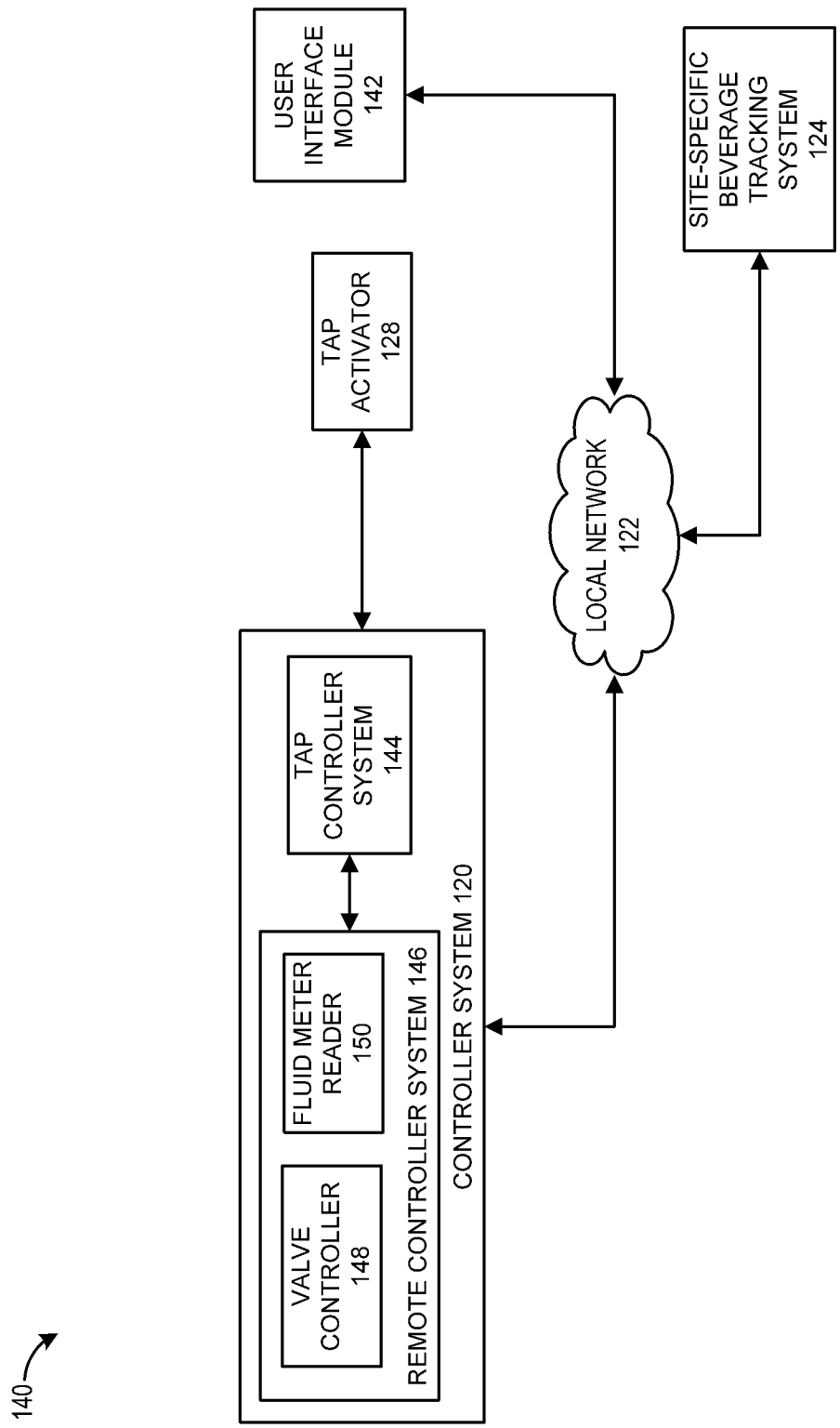
FIG. 1B illustrates an example of a block diagram of the dispenser control system for a beverage dispensing system.

FIG. 1B illustrates an example of a block diagram of the dispenser control system 140 for a beverage dispensing system 102. The dispenser control system 140 includes the controller system 120, the tap activator 128, the site specific beverage tracking system 124, and an optional user interface module 142. As illustrated in FIG. 1B, the controller system 120 includes a tap controller system 144 and a remote controller system 146. The tap controller system 144 is generally located near (e.g., within a few inches or a few feet) the activator 128 and in some cases may be included as part of the activator 128. The tap controller system 144 can receive an activation request, including an identifier associated with the beverage-pour tracking device 126, from the activator 128. The tap controller system 144 can then provide the request to the remote controller system 146 and/or the site specific beverage tracking system 124. If it is determined that the activation request is to be granted, in some cases, the tap controller system 144 may receive a command to activate the beverage dispenser 102. The tap controller system 144 may then open the spout 114 or enable the tap handle 106 to be actuated to open the spout 114. Alternatively, the tap controller system 144 may provide the command to the activator 128 enabling the activator 128 to open the spout 114 or unlock the tap handle 106. In either case, the activator 128 may activate an interface, such as LED lights or an LCD display, to indicate the status of the activation request to the customer.

Advantageously, in certain embodiments, by placing the tap controller system 144 near the activator 128 and then providing the activation request to the remote controller system 146, or site-specific beverage tracking system 124, the activator 128 can be designed using low power components that are restricted in by the nature of the low power components in how far they can transmit a signal, either by wire or wirelessly. In such cases, the tap controller system 144 can act as a repeater for the activation request. In other cases, the tap controller system 144 may be located an unrestricted distance from the activator 128 and, in some instances, may be part of the remote controller system 146. In cases where the tap controller system 144 is part of the remote controller system 146 and in cases where the tap controller system 144 provides the activation request to the remote controller system 146, the controller system 120 may provide the activation request, or a request based on the activation request, to the site-specific beverage tracking system 124, which can provide a response to the command to the controller system 120 and/or the tap activator 128.

The remote controller system 146 can include a valve controller 148 and a fluid meter reader 150. The valve controller 148 can include a controller for opening and/or closing the valve 110. The valve controller 148 may open the valve 110 in response to one or more of the controller 120 and the site-specific beverage tracking system 124 indicating that the activation request is to be granted. The fluid meter reader can include any system that is capable of accessing the meter 118 to determine a measure of the amount of beverage poured from the beverage dispenser 102 or the container 104 of the beverage dispenser 102.

The user interface module 142 can include any system for presenting information to a user or customer regarding the beverage in the beverage dispenser 102. For example, the user interface module 142 may present information to the user including the identify the type of beverage, where the beverage was made, nutrition facts about the beverage, trivia about the beverage, the quantity of the beverage remaining in the container 104, customer ratings for the beverage, tips on how to best pour the beverage, a list of foods that go well with the beverage, etc. Further, in some cases, the user interface module 142 may enable the user to rate the beverage.

In some embodiments, the site-specific beverage tracking system 124 can include the controller system 120. Further, in some embodiments, the dispenser control system 140 may be combined into fewer elements or divided into additional elements.

FIG. 1C illustrates an example of a plurality of beverage dispensers installed at a beverage provider. As illustrated, any number of beverage dispensers 102A-102N may be installed in a wall 160. This wall 160 may be in a restricted location that can only be accessed by employees of a beverage provider. However, generally, the wall 160 will be at a location accessible by any customer. Advantageously, in certain embodiments, only customers who can legally drink can obtain a beverage from the beverage dispensers 102A-102N because a beverage-pour tracking device 126 is, in most cases, required to activate the beverage dispensers 102A-102N. Each of the beverage dispensers 102A-102N can be configured as describe above with respect to the beverage dispenser 102. Thus, in most cases, each beverage dispenser 102A-102N can have its own controller system 120 and tap activator 128. In some cases, at least some of the beverage dispensers may share a controller system 120 and/or tap activator 128. Although FIG. 1C illustrates the beverage dispensers installed in a wall, the location of the beverage dispensers is not limited as such. For example, the beverage dispensers may be installed in a bar, in a mobile cart, or in a vehicle, such as a truck or van.

Example of a Site-Specific Beverage Tracking System

FIG. 2 illustrates an example of a site-specific beverage tracking system 124. The site-specific beverage tracking system 124 can include any system for tracking beverage inventory at a beverage provider. Further, the site-specific beverage tracking system 124 can include any system that can determine whether to activate or allow a customer to access a beverage dispenser 102 to obtain a beverage. The determination can be based on a number of factors including available pre-paid credit and whether the customer has reached a limit specified by the beverage provider and/or any third-party organization that may set a limit on the amount of beverage consumed for monetary reasons, government regulations, or any other reason for setting a beverage-access limit. Although the site-specific beverage tracking system 124 is illustrated as a single system, in some cases the site-specific beverage tracking system 124 may be implemented as a distributed system.

At least some of the site-specific beverage tracking system 124 can be included on a computing client or server system as a software application. However, in some cases, the site-specific beverage tracking system 124 may be part of an application-specific hardware system that can be installed in a client or server system or that can be a stand-alone hardware system. Typically, a beverage provider will have a single site-specific beverage tracking system 124. However, it is possible for a beverage provider to have multiple site-specific beverage tracking systems that can share data (e.g., via a common repository or through communication over a network). In cases where a beverage provider has multiple locations, each location may have a site-specific beverage tracking system 124 that can communicate with each other. In other cases, site-specific beverage tracking systems do not communicate with each other. However, in some such cases, data can be shared via a multi-site beverage-data system. The multi-site beverage-data system will be described in more detail below with respect to FIG. 3.

The site-specific beverage tracking system 124 can include a number of modules or subsystems, some of which may include software and some of which may comprise hardware. These modules or subsystems can include an inventory repository 202, a customer repository 204, a consumption tracking module 206, a consumption control module 208, an inventory monitoring module 210, a restocking module 212, an identification reader 214, and a multi-site beverage-data system interface module 216. The inventory repository 202 can include any type of database or repository for storing information or metadata relating to a beverage provider's beverage inventory. This information is not limited and can include inventory information, prices, information on special offers, sales information, vendor information, etc. Like the inventory repository 202, the customer repository can include any type of database or repository for storing information or metadata relating to a beverage provider's customers. This information can include customer demographics, pre-paid credit information, quantity of product consumed, total and/or during a specific visit, consumption thresholds associated with customers generally or with specific customers, customer preferences, etc. Although illustrated separately, in some cases, the inventory repository 202 and customer repository 204 can be combined. In other cases, the repositories may be further divided. For example, the inventory repository 202 can be split into separate repositories for inventory and for sales.

The consumption tracking module 206 can include any system for tracking how much beverage a customer associated with a beverage-pour tracking device 126 has poured from one or more beverage dispensers 102. Further, the consumption tracking module 206 can keep track of whether the customer has reached a maximum pour quantity for beverages offered by the beverage provider. The consumption control module 208 can include any system for determining whether to activate a beverage dispenser 102 in response to receiving an activation request from the beverage dispenser. Further, the consumption control module 208 can cause the controller system 120 of a beverage dispenser 102 to enable access to the beverage of the beverage dispenser 102.

As previously described, the tap activator 128 of a beverage dispenser 102 sends an activation request to the controller system 120 in response to a beverage-pour tracking device 126 being brought within a threshold distance of the tap activator 128. This beverage-pour tracking device 126 is associated with a customer of the beverage provider by the identification reader 214. The identification reader 214 can read or access a piece of identification associated with the customer (e.g., a drivers license, a passport, etc.) and generate a unique identifier based on the customer's identification. The identification reader 214 can then associate the unique identifier with the customer at the customer repository 204. Further, the identification reader 214 can read an identifier, which is also unique, associated with the beverage-pour tracking device 126 and associate the identifier with the customer at the customer repository 204. Once the unique identifier of the customer and the unique identifier of the beverage-pour tracking device 126 are associated at the customer repository 204, the consumption tracking module 206 can track how much beverage a customer pours at the customer repository 204 by tracking how much beverage is poured at one or more beverage dispensers 102 that are activated using the beverage-pour tracking device 126.

The inventory monitoring module 210 can maintain the inventory repository 202 enabling the beverage provider to keep track of inventory. Further, when inventory within a container 104 drops below a threshold for a beverage, the inventory monitoring module 210 can alert an employee of a beverage provider to replace the container 104. Moreover, if total stock of a beverage drops below a threshold, the inventory monitoring module 210 can alert an employee to order more of the beverage from a supplier. Alternatively, the inventory monitoring module 210 can use the restocking module 212 to automatically place an order for additional beverage from a supplier or manufacturer.

In some embodiments, the site-specific beverage tracking system 124 can monitor and store additional information or metadata associated with one or more beverage dispensers 102. The metadata may be stored at the inventory repository 202, or at a separate repository. Further, in some cases, the metadata may be provided to a multi-site beverage-data system 302, which is described in more detail below.

The metadata can include any type of information related to the beverage dispensers 102. For example, the site-specific beverage tracking system 124 can store the location of each beverage dispenser 102 at a beverage provider. This location information may be manually entered by a user or may be determined based on location sensing technology (e.g., GPS, wireless signal triangulation, etc.), some of which may be part of the tap activator 128. Advantageously, by storing the location of the beverage dispensers 102, the site-specific beverage tracking system 124 can identity to a user a location of a beverage dispenser that includes a beverage the user desires, or a location of a beverage dispenser 102 that needs a new container 104, maintenance, or cleaning.

Further, the metadata may include an identity of every type of beverage that has been dispensed by a beverage dispenser 102 over a specific period of time, over the time that the beverage dispenser has been installed at a beverage provider, or since the beverage dispenser 102 has been manufactured. In some cases, identifying the types of beverages dispensed by a beverage dispenser requires a user manually enter the beverage in a container 104 each time the container 104 is replaced or refilled. However, in other cases, the identity of the beverage may be determined automatically using, for example, a RFID tag attached or associated with the container 104 or by scanning a machine-readable code on the container 104.

In addition, the site-specific beverage tracking system 124 may track the overall volume dispensed by the beverage dispenser 102 over a specific period of time, over the time that the beverage dispenser has been installed at a beverage provider, or since the beverage dispenser 102 has been manufactured. This information may be obtained, for example, by the fluid meter reader 105 accessing the meter 118 of the beverage dispenser 102.

In some implementations, the metadata can include maintenance history of the beverage dispenser 102. This maintenance history can include repairs to the beverage dispenser 102 and/or cleaning history of the beverage dispenser 102. Repairs to the beverage dispenser 102 may be logged by a user and/or may be identified by scanning a machine-readable code associated with a part that is being removed and/or with a part that is being installed in the beverage dispenser 102.

Similarly, the cleaning history of the beverage dispenser 102 may be manually entered. In addition, in some cases, information associated with the cleaning history of the beverage dispenser 102 may be determined by the beverage dispenser 102 and/or the controller system 120. For example, the fluid meter reader 150 can read the meter 118 to identify the amount of cleaning fluid that flows through the pipe 112 of the beverage dispenser 102. Further, the controller 120 may record the time each time the cleaning fluid is used. Advantageously, by storing the cleaning history of the beverage dispenser 102, the site-specific beverage tracking system 124 can identify when the beverage dispenser was last cleaned, whether cleaning is past due, and when the next cleaning should be scheduled. Further, the site-specific beverage tracking system 124 can, in some cases, use information relating to the rate with which the beverage dispenser 102 is dispensing a beverage to anticipate when the next cleaning should be scheduled. The site-specific beverage tracking system 124 can then provide advance notice to a user that a beverage dispenser 102 needs cleaning.

Example Beverage Provider Environment

Figure 3:
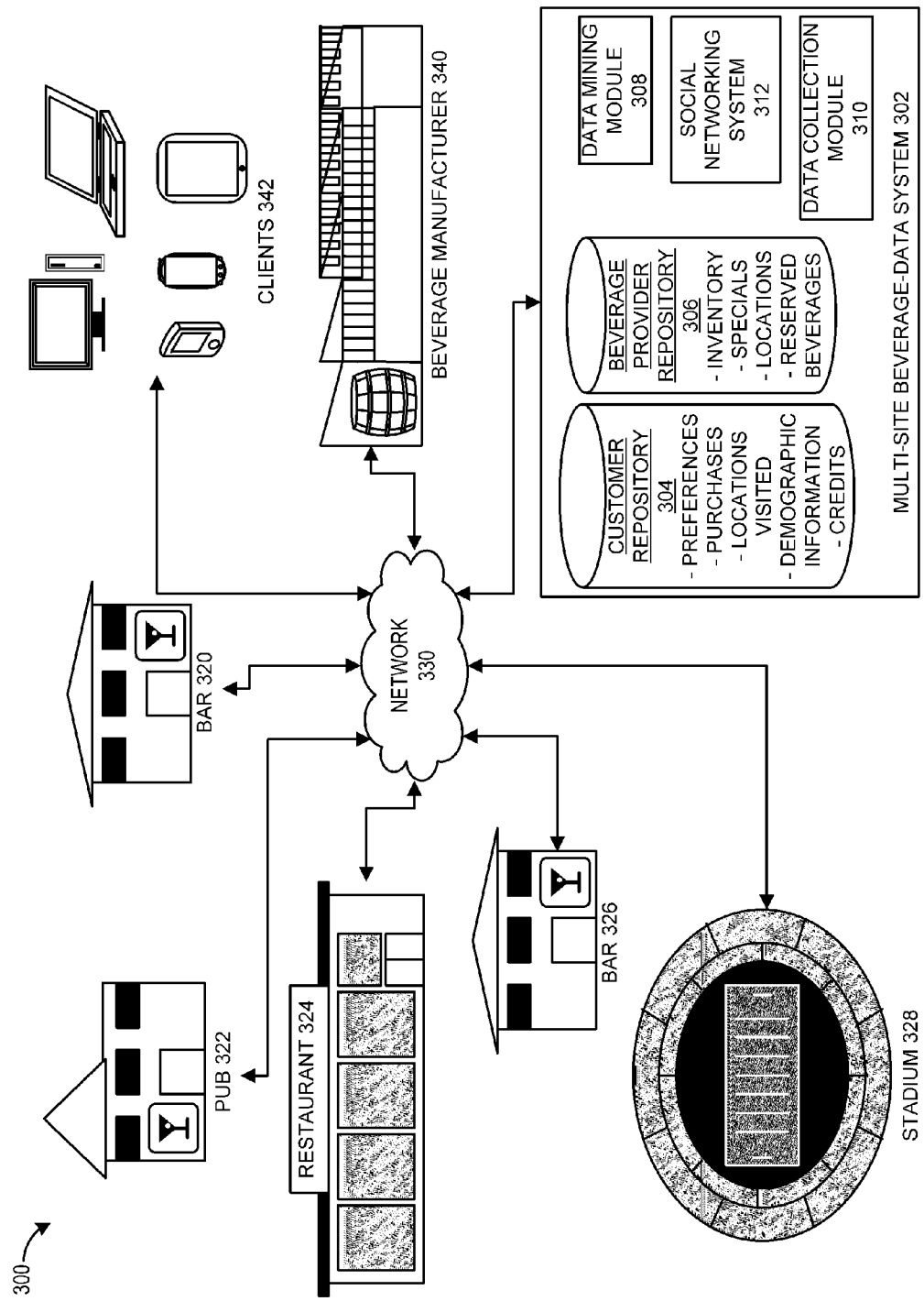
FIG. 3 illustrates an example of a beverage provider environment including a multi-site beverage-data system.

FIG. 3 illustrates an example of a beverage provider environment 300 including a multi-site beverage-data system 302. The beverage provider environment 300 can include any number and/or type of beverage provider. FIG. 3 illustrates several non-limiting examples of beverage providers that can implement and/or use the systems and methods described herein. In the example of FIG. 3, the beverage provider environment includes beverage providers 320, 322, 324, 326, and 328. Beverage providers 320, 322, and 326 can represent bars, pubs, or any other type of establishment whose primary focus is selling beverages. In some cases, as illustrated by beverage providers 320 and 326 having the same image, at least some of the beverage providers may be owned by the same entity and/or may be franchisees of the same type. For example, the beverage provider 320 and the beverage provider 326 may be two different locations of the same bar.

Some beverage providers can include establishments that focus on more than beverages or that focus on alternative products, but also provide beverages. For example, beverage provider 324 can represent a restaurant, diner, eatery, or any other type of establishment that focuses on selling food. Further, some beverage providers may service customers of other establishments. For example, as illustrated by beverage provider 328, some beverage providers may service stadiums or other entertainment venues that may opt to provide beverages. The beverage provider 328 may be owned by the stadium or may be part of an independent entity or organization. Moreover, the beverage providers may service and/or may include convention centers, movie theatres, concerts, or any other type of establishment that might provide beverages. In some cases, the beverage providers may service and/or include temporary events, such as festivals or fairs. In some instances, the beverage provides can include mobile establishments, such as food trucks or drink trucks. Although different types of establishments may use the systems and methods described herein, to simplify discussion, each type of establishment is generally referred to as a beverage provider herein.

Regardless of the type of beverage provider, each beverage provider may include its own site-specific beverage tracking system 124, which may be located at the location where the beverages are served or may be located elsewhere, and one or more beverage dispensers 102 for enabling users to pour their own beverages. Further, each beverage provider's site-specific beverage tracking system 124 may communicate with the multi-site beverage-data system 302 via a network 330. The network 330 can include any type of network including a LAN, WAN, cellular network, and the like. Further, in some cases, the network 330 can include the Internet.

Generally, the beverage provider environment 300 includes a single multi-site beverage-data system 302 that is accessible by each beverage provider via the site-specific beverage tracking system 124 and/or a computing system. However, in some cases, the beverage provider environment 300 may include multiple multi-site beverage-data systems 302. For example, a subset of the beverage providers (e.g., a set of franchise locations) may be associated with its own multi-site beverage-data system 302.

In some cases, the beverage provider environment 300 can include one or more beverage manufacturers 340, which in some cases can include beverage suppliers or distributors. The beverage manufacturers 340 can include any manufacturer, seller, supplier, or distributer of beverages. In some cases, one or more of the beverage providers can communicate with the beverage manufacturer 340 via the network 330. For example, in some cases, the beverage manufacturer 320 using, for example, the restocking module 212 of the site-specific beverage tracking system 124 can place an order for additional beverage supply with the beverage manufacturer 340. The order may be initiated by an employee or may occur automatically in response to the inventory at the beverage manufacturer failing to satisfy a minimum threshold.

As indicated above, the beverage provider environment 300 includes a multi-site beverage-data system 302. The multi-site beverage-data system 302 can include any system that can collect beverage provider data and customer data from beverage providers by communicating with the site-specific beverage tracking systems 124 of the beverage providers. The beverage provider data can include any type of data associated with the beverage providers and the products offered by the beverage providers. For example, the beverage provider data can include inventory information (e.g., beverages offered, amount in stock of each beverage offered), information on specials, location information for the beverage provider, information on beverage reservations (e.g., eligible beverages, quantity available for reservation), pricing information, etc.

The customer data can include any type of data associated with customers of the beverage providers. For example, the customer data can include the identity of a customer, prepaid credits associated with the customer, reservation data for reserving beverages, identity of what the customer drank, how much the customer drank, any ratings supplied by the customer for the beverages poured and/or for the beverage provider, when the customer visited the beverage provider and for how long, etc.

The beverage provider data and/or the customer data may be obtained via a data collection module 310 that is capable of communicating with the site-specific beverage tracking systems 124. Additional customer data may also be obtained from customers. For example, a customer may provide information when establishing an account with a site-specific beverage tracking system 124, the multi-site beverage-data system 302, or via a social networking website, which can be hosted by the social networking system 312. The customer provided information can include personal or demographic information (e.g., name, address, age, height, weight, etc.), preferences (e.g., favorite beverages, favorite brands, etc.), and any other type of information that may be collected from a user of a social networking website. In some cases, at least some of the personal information may be obtained from an identification, which for legal reasons may be required to establish an account with the site-specific beverage tracking system 124, the multi-site beverage-data system 302, or the social networking website 312. This identification may include a government identification and/or any identification that can establish the user's age. For example, the identification may be a driver's license, a passport, a social security card, etc.

Generally, the beverage provider information can be stored at the beverage provider repository 306 while the customer information may be stored at the customer repository 304. However, in some cases, the repositories may be combined or further divided.

In addition to the aforementioned systems, the multi-site beverage-data system 302 may also include a data mining module 308. The data mining module 308 can include any system that can analyze and/or query the customer repository 304 and/or the beverage provider repository 306. In some cases, the data mining module 308 can determine customer preferences based on characteristics shared between beverages poured by the customer. The characteristics may be weighted based on, for example, how much of a beverage a customer drinks, how many beverages the customer drinks share the characteristics, the rating, if any, that the customer rated the beverage, or any other method for weighting beverage characteristics. Further, a beverage provider may use the data mining module 308 to query the repositories to identify customers and/or potential customers that may be interested in a beverage and/or a special offer for a beverage. A customer may use the data mining module 308 to identify beverages that may have similar characteristics to beverages that the customer likes. In some embodiments, the beverage manufacturer 340 may use the data mining module 308 to determine how well a product is selling, or to identify the types of customers that are purchasing the beverage, which may be useful in directing an advertisement campaign or in identifying new markets to target.

Figure 9:
FIG. 9 illustrates an example profile page for a customer at a beverage-based social networking site.

As mentioned above, the multi-site beverage-data system 302 may include a social networking system 312. Although illustrated as part of the multi-site beverage-data system 302, in some cases, the social networking system 312 may be a separate system, which may include one or more servers for a hosting a social networking website. The social networking website enables a user to connect with friends and to post information about beverages and beverage providers the user may like, or in some cases, dislike. Further, the social networking website enables beverage providers to search for potential customers and to post specials that potential customers may be interested in based on prior purchases. In addition, the user can reserve beverages and buy beverages for friends via the social networking website. Reserving beverages can be advantageous for beverages that may be in limited supply. For example, in some cases, seasonal or craft beers may run out of stock more quickly than other beverages. Beverage providers that offer reservations on beverages may help build loyalty among existing customers and may help attract new customers who like the idea of knowing their beverage of choice will be available. FIGS. 9-11 provide several examples of social networking pages that may be presented by the social networking system 312. These examples are described in more detail below.

The social networking system 312 may be accessed by users and/or employees of the beverage providers via one or more clients 342. These clients 342 can include any type of computing system that can be used to access a website and/or application that can provide social networking features. For example, the clients 342 can include a desktop computer, a laptop, a smartphone, a tablet, a phablet, a television, a gaming device, and any other computing system that can communicate with the social networking system 312. Advantageously, in cases where a user interacts with the social networking system 312 via a mobile computing device (e.g., a smartphone), the user can check-in at a beverage provider 320, rate beverages while the user drinks the beverage, learn of drink specials while at the beverage provider 320, and identify when a beverage container 104 was opened when selecting a beverage while at the beverage provider 320. Although the user can perform some or all of the above tasks when not at the beverage provider 320, using a mobile device makes performing the above tasks possible regardless of where the user is located.

Example User Account Linking Process

Figure 4:
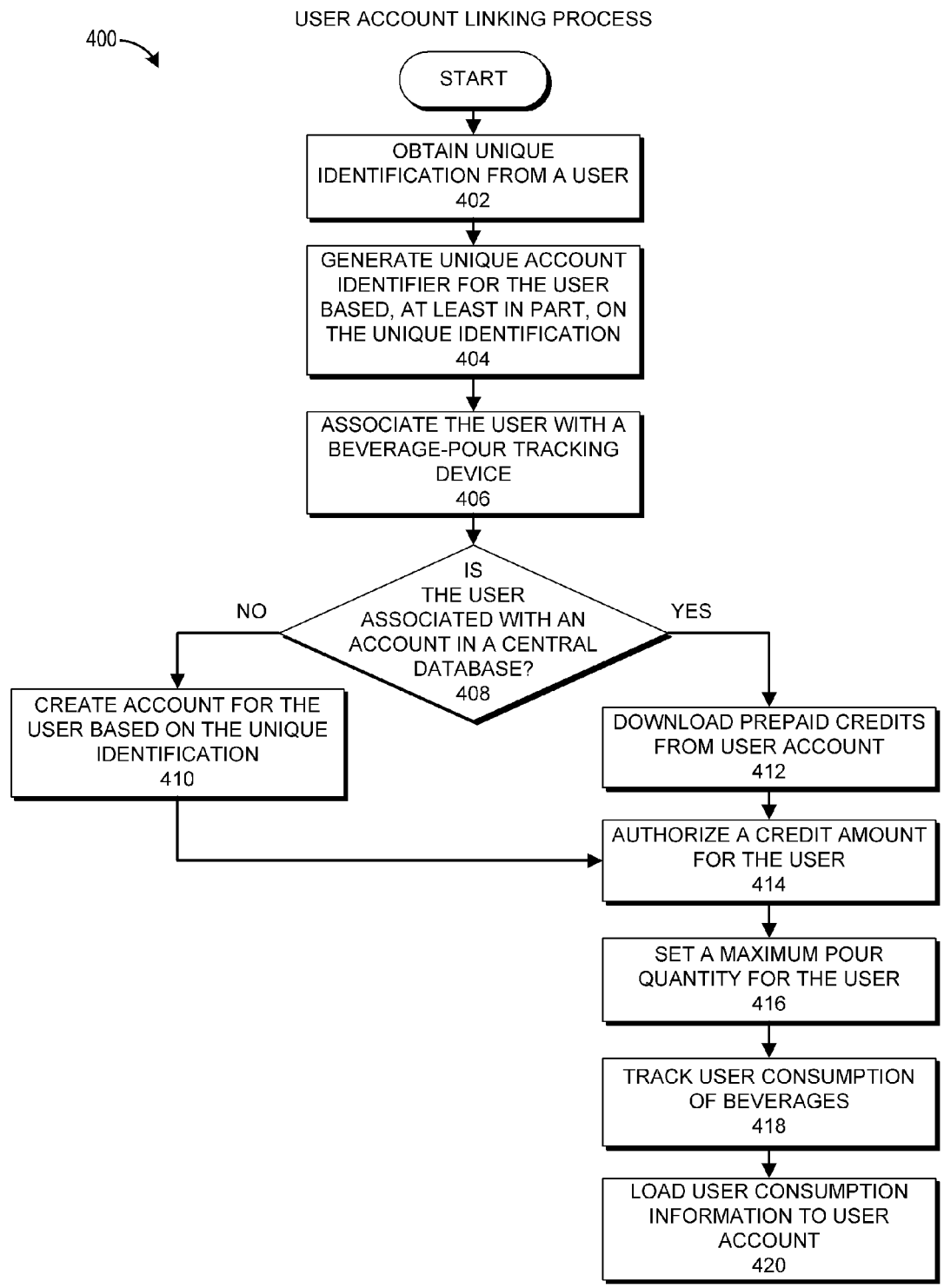
FIG. 4 is a flowchart illustrating an example of a user account linking process.

FIG. 4 illustrates an example of a user account linking process 400. The process 400 can be implemented, at least in part, by any system that can associate a user (e.g., a customer) with a beverage-pour tracking device 126 and an account at a site-specific beverage tracking system 124 associated with a beverage provider (e.g., the beverage provider 320). Further, the process 400 can be implemented, at least in part, by any system that can associate the user with an account at a multi-site beverage-data system 302. For example, the process 400, in whole or in part, can be implemented by the site-specific beverage tracking system 124, the identification reader 214, and the multi-site beverage-data system interface module 216, to name a few. Although any number of systems, in whole or in part, can implement the process 400, to simplify discussion, portions of the process 400 will be described with reference to particular systems. Further, to simplify discussion, the process 400 will be described assuming a customer is at the beverage provider 320. Depending on the embodiment, the method of FIG. 4 may include fewer or additional blocks and/or the blocks may be performed in an order different than is illustrated.

The process 400 begins at block 402 where, for example, an identification reader 214 obtains access to a unique identification from a user (e.g., a customer). The block 402 can include a process that enables the identification reader 214 to access information embedded in the identification. For example, the user, or a second user (e.g., an employee), may slide a magnetic stripe of the identification through the identification reader 214 or place the identification in front of a scanner to read a machine-readable code (e.g., a bar code or QR code). In other cases, the second user may type information from the ID into the identification reader 214. The identification can include any type of unique identification, including a government identification, such as a drivers license, a passport, an identification card, etc. Generally, the identification reader 214 can determine information about the user based on the identification including the user's name, age, gender, etc. Advantageously, using the user data obtained by accessing the identification, the identification reader 214 can determine whether the user satisfies a criteria for obtaining beverages as the beverage provider. In other words, the identification reader 214 can determine whether the user is at least 21-years old.

At block 404, the identification reader 214 generates a unique account identifier for the user based, at least in part, on the unique identification. Although the identifier is unique, it is generally repeatable. Thus, if the user provides the same identification to the identification reader 214, the identification reader 214 will generate the same unique identification. Advantageously, in certain cases, using a repeatable formula for generating the unique identification enables the user to be associated with the same account each time the user visits the beverage provider. Further, in some cases, each site-specific beverage tracking system 124 uses the same formula to generating the unique identification. Advantageously, in certain cases, using the same formula to generate the unique identification enables the user to be associated with the same account at a multi-site beverage-data tracking system 302 regardless of which beverage provider the user visits. After generating the unique account identifier, the identification reader can associate with user with the identifier at the customer repository 204. In some cases, the user may already be associated with an account at the site-specific beverage tracking system 124. In such cases, the block 404 may include updating the customer repository 204 to indicate that the user is currently at the beverage provider 320. In other embodiments, the unique account identifier is associated with the customer (and the unique identification), but is randomly generated (or generated in a way that is not repeatable) such that the unique account identifier assigned to a customer at a bar may be different than a unique account identifier assigned to the customer on a subsequent visit to the bar.

The identification reader 214 associates the user with a beverage-pour tracking device 126 at block 406. This beverage-pour tracking device 126 can be a Radio Frequency Identifier (RFID). The RFID may be part of a bracelet, a card, or other medium for holding the RFID. In some cases, an RFID bracelet is secured around a user's appendage (e.g., wrist) and becomes non-functional when removed. Thus, the RFID bracelet cannot be passed to other users (e.g., minors) or reused once removed. In other cases, the RFID bracelet may be reusable. Inclusion of the beverage-pour tracking device in a bracelet may advantageously allow the customer to pour drinks without any special interactions with the tap, bartender, or payment system. For example, because the bracelet is proximate to the activator when the customer reaches for the tap, the tap may be activated in real-time without any slowdown in the pouring process. In particular, identification of the customer, determining amounts of beverage available, determining amounts of beverage that the customer has paid for, and/or other processes described herein, may be performed in real-time as the user is approaching and/or grabbing the tap to pour the beverage.

In some embodiments, instead of an RFID, the beverage-pour tracking device 126 can be a magnetic button, a NFC device, an application on a smartphone, or any other device that can be associated with a user at a customer repository 204 and can be used to cause a tap activator to send an activation request to a controller system 120.

To associate the beverage-pour tracking device 126 with the user, the identification reader 214 can access a unique identifier stored on the beverage-pour tracking device 126. The identification reader 214 can then associate unique identifier of the beverage-pour tracking device 126 with the user at the customer repository 204. Thus, the user can be associated with the unique identifier generated at the block 404 and the unique identifier of the beverage-pour tracking device 126 at the customer repository 204.

At decision block 408, the multi-site beverage-data system interface module 216 determines whether the user is associated with an account at the customer repository 304 of the multi-site beverage-data system 302. This determination may be made by identifying whether the account identifier generated at the block 404 exists at the customer repository 304. If the user does not have an identifier account at the multi-site beverage-data system 302, the multi-site beverage-data system interface module 216 creates at block 410 an account for the user at the multi-site beverage-data system 302 based on the unique identification received at the block 402.

If the multi-site beverage-data system interface module 216 determines that the user is associated with an account at the multi-site beverage-data system 302, the multi-site beverage-data system interface module 216 can download prepaid credits, if any, from the user's account at the multi-site beverage-data system 302 to the user's account on the customer repository 204 at block 412. Generally, the prepaid credits are in terms of dollars, or money. However, in some cases, the prepaid credits may be associated with beverage quantity (e.g., a pint of beer). The prepaid credits can include credits for money previously paid by the user, reward credits for customer loyalty programs or contests, purchases by friends of the user on the user's behalf, or any other reason for prepaid credits being associated with a user. Prepaid credits may be usable at any beverage provider or may be associated with specific beverage providers. In the latter case, the block 412 may include downloading only prepaid credits associated with the beverage provider 320. In some cases, there may be no prepaid credits associated with the user. The block 412 may also include downloading any reservation information associated with beverages reserved by the user. Further, in some embodiments, the block 412 may be optional.

At block 414, the consumption tracking module 206 authorizes a credit amount for the user by, for example, associating a credit amount with the user's account at the customer repository 204. The credit amount can include prepaid credits downloaded at the block 412, if any, and any additional prepaid credits the user decides to purchase. In some cases, the credit amount is not prepaid, but is a maximum that the beverage provider 320 is willing to allow the user to spend before, for example, payment must be collected or the user must check-in with an employee of the beverage provider 320. In some embodiments, the block 414 is optional.

At block 416, the consumption tracking module 206 sets a maximum pour quantity for the user. The maximum pour quantity generally is a maximum number of ounces, or other measurement, that a user can pour before checking-in with an employee of the beverage provider 320 to determine whether the user is authorized to pour more beverages. If the employee does authorize additional pour quantity, the employee can allocate the same maximum pour quantity or authorize a different maximum. Advantageously, by limiting how much a user can pour before checking-in with an employee of the beverage provider 320, the beverage provider 320 can assess a user's level of inebriation before allowing the user to drink more. The maximum pour quantity may be the same for each user or may be based on the user. For example, the maximum pour quantity may be based on the user's weight, gender, body type, or other factor that may impact how easily a user becomes inebriated. In some cases, the maximum pour quantity may be based on one or more algorithms for determining the impact of alcohol on a user. For example, the maximum pour quantity may be based on a calculation of Widmark's formula for calculating blood alcohol concentration at a specific time for a user with a particular weight who consumes a particular number of liquid ounces. In some embodiments, the block 416 is optional.

At block 418, the consumption tracking module 206 tracks user consumption of beverages at the beverage provider 320. Tracking user consumption of beverages generally refers to tracking how much a user has poured from beverage dispensers 102 at the beverage provider 320, regardless of whether the user actually drank the beverages. Further, tracking user consumption can include tracking what the user poured, how much of each type or brand of beverage the user poured, any ratings provided by the users for the beverages, where the user obtained the beverage (e.g., the beverage provider 320), and any other information that can be obtained by monitoring the user's use of the beverage dispenser 102. Monitoring of the user's consumption is generally accomplished by storing the identity of beverage dispenser's 102 accessed by the user using the beverage-pour tracking device 126 as well as the quantity poured. The process of obtaining the beverage and tracking the user's consumption is described in more detail below with respect to FIG. 5.

At block 420, at least some of the user consumption information is uploaded to the user's account at the customer repository 304 of the multi-site beverage-data system 302. For example, the user's purchases and ratings may be uploaded to the customer repository 304. In some cases, an aggregation of the user data is uploaded to the customer repository 304 and/or existing data at the customer repository 304 is updated or modified based on the consumption information uploaded at the block 420.

In addition, at the block 420, the user consumption information may be stored at the customer repository 204 of the site-specific beverage tracking system 124. The information at the customer repository 204 may be stored indefinitely, for a specified period of time, or until the user pays his or her tab. In some embodiments, at least some of the information uploaded at the block 420 may be accessed by other beverage providers, by the user's friends or contacts, and by the user. In certain embodiments, the block 420 may be optional.

Example Beverage Pour Process

Figure 5:
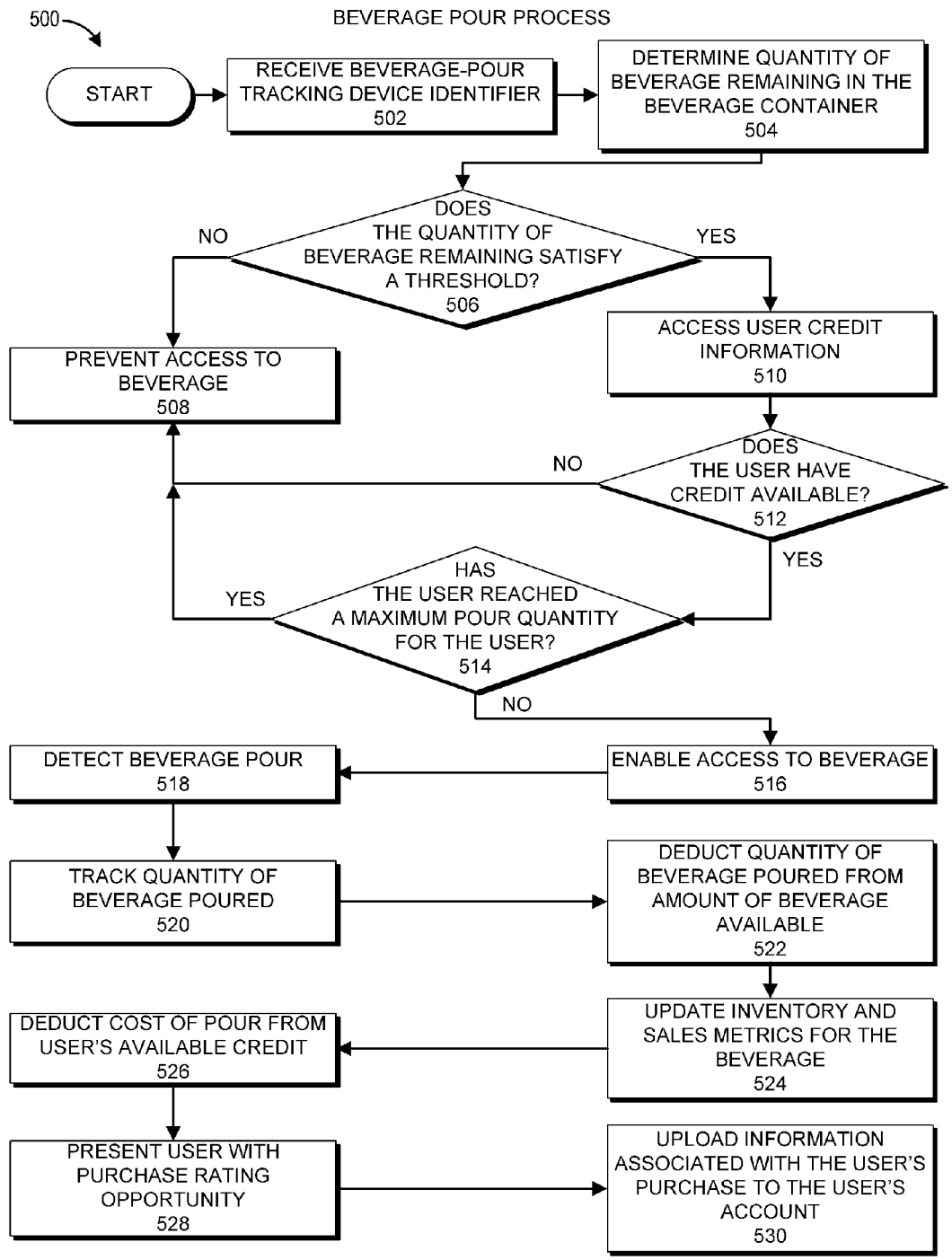
FIG. 5 is a flowchart illustrating an example of a beverage pour process.

FIG. 5 illustrates an example of a beverage pour process 500. The process 500 can be implemented, at least in part, by any system that can determine whether a user (e.g., a customer) can access a beverage of a beverage dispenser 102 and if so, provide the user with access to the beverage. For example, the process 500, in whole or in part, can be implemented by the beverage dispenser 102, the site-specific beverage tracking system 124, and the controller system 120, to name a few. Although any number of systems, in whole or in part, can implement the process 500, to simplify discussion, portions of the process 500 will be described with reference to particular systems. Further, to simplify discussion, the process 500 will be described assuming a customer of the beverage provider 320 is attempting to access the beverage dispenser 102. Depending on the embodiment, the method of FIG. 5 may include fewer or additional blocks and/or the blocks may be performed in an order different than is illustrated.

The process 500 begins at block 502 where, for example, the consumption control module 208 of the site-specific beverage tracking system 124 receives a beverage-pour tracking device 126 identifier from a beverage-pour tracking device 126 associated with a user. Typically, the consumption control module 208 receives the beverage-pour tracking device 126 identifier in response to the user bringing the beverage-pour tracking device 126 within a threshold distance of the tap activator 128 thereby enabling the tap activator 128 to access an RFID or QR code of the beverage-pour tracking device 126 or to establish an NFC link with the beverage-pour tracking device 126. The beverage-pour tracking device 126 identifier is then provided to the site-specific beverage tracking system 124 or to the controller system 120, which provides the identifier to the site-specific beverage tracking system 124.

Once the consumption control module 208 receives the beverage-pour tracking device 126 identifier, the consumption control module 208 determines the quantity of beverage remaining in the beverage container 104 of the beverage dispenser 102 at block 504. Determining the remaining quantity of beverage in the beverage container 104 generally involves accessing the inventory repository 202 to determine the amount of beverage remaining in the beverage container 104. For example, the consumption control module 208 can determine if the amount of beverage sold or poured matches the amount of beverage included in the container 104, or a threshold adjusted quantity in the container 104. Alternatively, the consumption control module 208 may determine the quantity of beverage remaining in the beverage container 104 by accessing a sensor include with the beverage dispenser 102 (e.g., in the container 104) to determine the quantity of beverage remaining in the container 104.

At decision block 506, the consumption control module 208 determines whether the amount of beverage remaining in the beverage container 104 satisfies a threshold. The threshold may be preset by the beverage supplier, or may be set by an employee of the beverage provider 320. Typically, the threshold is based on a minimum amount of beverage that should be in the container 104, which may be based on the type of container 104, the beverage dispenser 102, and/or the type of beverage in the container 104. This minimum may be selected to ensure that the pipe 112 contains a minimum quantity of beverage. Advantageously, in certain embodiments, ensuring that the pipe 112 contains a minimum quantity of beverage prevents the waste of beverage that may occur when priming the beverage dispenser 102. Further, it may prevent the uncontrolled spray of beverage that can occur when air is in the pipe 112 due to a below minimum amount of beverage in the pipe 112. In some cases, the threshold may be based, at least in part, on how far in advance the beverage provider wishes to be informed that the container 104 will need changing or refilling. For example, does the beverage provider wish to be informed when there are 8, 16, or 32 ounces remaining in the container 104. This decision may be based, for example, on the popularity of the beverage or the length of time required to replace or refill the container 104. In some embodiments, the threshold for the beverage is stored in the inventory repository 202, which may be accessed by the consumption control module 208 and/or the inventory monitoring module 210 to determine the threshold.

In some cases, the threshold may be adjusted dynamically. For example, the threshold may be adjusted based on the amount of reserved beverage, as will be described in FIG. 6, based on the time of day, how many customers are currently at the beverage provider 320, and/or the rate of consumption or pour of the beverage over a specific period of time. In other cases, a separate threshold may exist that is adjusted for the amount of reserved beverage. In such cases, when a first threshold associated with a quantity of reserved beverage is reached, the inventory monitoring module 210 may determine if additional containers or supply of the beverage is in stock or inventory at the beverage provider 320. This determination may be made by accessing information at the inventory repository 202 associated with the beverage. If more supply does exist in inventory, the consumption control module 208 may allow beverage to be poured from the beverage dispenser 102 until a second threshold, associated with a minimum amount of beverage in the container, as described above, is reached. If there is no more supply in inventory, the consumption control module 208 may prevent beverage from being dispensed by any customer that has not reserved the beverage once the first threshold is reached.

If at the decision block 506 the consumption control module 208 determines that the quantity of beverage remaining does not satisfy the threshold, the consumption control module 208 prevents access to the beverage at the beverage dispenser 102 at block 508. Preventing access to the beverage can include sending a signal to the controller system 120 to not open the valve 110, to not unlock the tap handle 106, and/or to not open the spout 114. In other cases, preventing access to the beverage can include not sending a signal to the controller system 120 to allow access to the beverage in the beverage dispenser 102. In some cases, preventing access to the beverage can include alerting an employee to change or refill the container 104. In addition, if the alert may include informing the employee that additional supply of the beverage for the beverage dispenser 102 should be ordered from the beverage manufacturer or supplier 340. In some cases, the block 508 can include the restocking module 212 automatically placing an order for a resupply of the beverage.

If at the decision block 506 the consumption control module 208 determines that the quantity of beverage remaining does satisfy the threshold, the consumption tracking module 206 accesses user credit information at block 510. Accessing user credit information can include accessing a user account associated with the customer at the customer repository 204. The user account may be identified based on the beverage-pour tracking device 126 identifier received at the block 502, which may be associated with the user when the user obtains the beverage-pour tracking device 126 from the beverage provider 320, or an employee of the beverage provider 320. The user credit information may include an amount of prepaid credit remaining for the user, or any other type of credit the user may have acquired, such as gifts from friends, rewards from contests, loyalty credits from the beverage provider 320, etc. In some cases, the credit may be a limit on how high of a tab the user may reach before payment is required by the beverage provider 320 to continue obtaining beverages.

At decision block 512, the consumption control module 208 determines whether the user has sufficient credit available to pour the beverage from the beverage dispenser 102. If not, the consumption control module 208 prevents access to the beverage at block 508. Preventing access to the beverage can include informing the user that additional credits must be purchased before access to the beverage can be granted. Further, in some cases, the block 508 can include informing an employee of the beverage provider 320 that the user may require a purchase of additional credits thereby facilitating with customer service from the employee. In some embodiments, the blocks 510 and 512 may be optional. For example, if the beverage provider 320 does not require prepayment from the user, the blocks 510 and 512 may be optional. Further, in some cases, if the user does have sufficient credit available, the cost for beverage pours are deducted from the credits, and if the user does not have credit available, the drink pours are adding to a tally or tab of money owed, but access to the beverage is not prevented.

If the user has sufficient credit available, the consumption control module 208 determines whether the user has reached a maximum pour quantity for the user at decision block 514. In certain embodiments, users may be associated with a maximum amount of beverage that can be poured. Advantageously, in certain embodiments, the beverage provider 320 can control the level of inebriation of its customers by the setting of the maximum pour quantity. In some cases, the maximum pour quantity may be based on the specific user. For example, customers of a particular weight, build, or gender may be allocated a different maximum pour quantity than customers of a different weight, build, or gender. In some cases, the maximum pour quantity is a static measure. In other cases, the maximum pour quantity is set in relation to time. For example, a customer may be permitted to pour 64 ounces of beverages per hour. In some embodiments, because the beverage provider 320 can access an account associated with a user at the multi-site beverage-data system 302, determining whether a user has reached the maximum pour quantity can include determining how much beverage a customer has poured over a given time at any beverage provider that uses at least some of the systems described herein.

If the user has reached the maximum pour quantity, the consumption control module 208 prevents access to the beverage at block 508. In some cases, preventing access to the beverage can including informing the user that the user has reached the maximum pour quantity, and in some cases, informing the user to check in with an employee to obtain access to additional beverage. In some cases, the employee can authorize the customer to obtain additional beverage by increasing the limit maximum pour quantity associated with the customer. In such cases, the employee can assess the level of inebriation of the customer and decide whether the customer should be prevented from pouring additional beverages. Further, in some cases, the employee may be informed that a customer has reached the maximum pour quantity thereby facilitating with customer service from the employee.

In some embodiments, the decision block 514 may be optional. Further, in some embodiments, one or more of the blocks 510, 512, and 514 may be performed on a continuous basis during a pour thereby preventing a customer who is permitted to pour a set quantity from exceeding that quantity during the pour process. For example, by performing the blocks 510, 512, and 514 on a continuous basis during a pour, a customer who is permitted only four more ounces can be prevented from obtaining eight ounces during a single pour. In some embodiments, the site-specific beverage tracking system 124 may perform the continuous monitoring during a pour. Alternatively, the site-specific beverage tracking system 124 may inform the controller system 120 of impending limits to the customer's account and the controller system 120 may prevent the user from exceeding those limits during a pour.

If the user has not reached the maximum pour quantity, the consumption control module 208 enables access to the beverage at block 516. Enabling access to the beverage can include sending a command to the valve controller 148 of the controller system 120 to open the valve 110. Further, enabling access to the beverage can include causing the tap controller system 144 and/or the tap activator 128 to unlock or allow actuation of the tap handle 106, thereby enabling the spout 114 to be opened by the user. In some cases, the tap handle 106 may be moved by the user, but may not open the spout 114 unless the tap handle 106 and/or spout 114 is unlocked by the controller system 120. In some embodiments, the block 516 can include activating a user interface element to inform the user that the beverage of the beverage dispenser 102 can be accessed. The user interface element can include LEDs on the tap activator 128 and/or a display on the user interface module 142.

At block 518, the controller system 120 detects when beverage is being poured from the beverage dispenser 102. Detecting when the beverage is being poured can include detecting movement of the tap handle 106 and/or fluid movement as measured by the meter 118, which can be read by the fluid meter reader 150. At block 520, the controller system 120 tracks the quantity of beverage poured from the beverage dispenser 102. Tracking the quantity of beverage poured may be based on readings of the meter 118 by the fluid meter reader 150, the amount of time the spout 114 is open, a reduction of beverage in the container 104 as measured by a sensor in the container 104, or by any other system that can detect the quantity of beverage poured.

The inventory monitoring module 210 deducts a measurement of the quantity of beverage poured from a measurement of the amount of beverage available at an inventory repository 202 at block 522. At block 524, the inventory monitoring module 210 updates inventory and sales metrics for the beverage at the inventory repository 202. In some cases, the block 524 can include updating inventory and sales metrics at a beverage provider repository 306. The inventory and sales metrics can include any information that the beverage provider 320 and/or the provider of the multi-site beverage-data system 302 opts to monitor. For example, the metrics can include the quantity of beverage remaining in the beverage dispenser 102, the quantity of beverage remaining in stock, the rate of sale, or pour, of the beverage, demographics of customers who purchase the beverage, the average and/or median price at the time or purchase of the beverage, etc.

At block 526, the consumption tracking module 206 deducts the cost of the pour from the user's available credit. Alternatively, the consumption tracking module 206 adds the cost of the pour to the user's tab. In either case, the consumption tracking module 206 can update the account associated with the user at the customer repository 204 to reflect the purchase of the beverage pour. The account can be identified based on the beverage-pour tracking device 126 identifier received at the block 502.

The user interface module 142 provides the user with an opportunity to rate the poured beverage at the block 528. The rating may be a numerical rating or a substitute for a numerical rating (e.g., a number of stars or a thumbs up). Further, the rating may include a review of the beverage. In some cases, the rating opportunity may be presented via an application or social networking interface accessed via a client 342. In some instances, the information collected at the block 528 may be uploaded to the user's account at the customer repository 204 of the site-specific beverage tracking system 124. In some embodiments, the block 528 is optional.

At block 530, the multi-site beverage-data system interface module 216 uploads information associated with the user's purchase to the user's account at the multi-site beverage-data system 302 and/or at the social networking system 312. The block 530 can include uploading information regarding what beverage the user poured, how much of the beverage the user poured, characteristics of the beverage poured (e.g., a beer, a glass of wine, a lager, an ale, a domestic, an import, a craft beer, a seasonal beer, etc.), the user's rating of the beer, and any other information that can be determined from the user's beverage pour. In some cases, the data collection module 310 may access the site-specific beverage tracking system 124 to obtain the information provided at the block 530 and/or the block 524 as well as any other data that may be collected by the site-specific beverage tracking system 124. The data collection module 310 may access the site-specific beverage tracking system 124 on command or at set times (e.g., each night at midnight). In some embodiments, the block 530 is optional.

In some embodiments, the sales information determined at the block 524 and/or the quantity of beverage poured as detected at the block 520 may be used to determine a fee paid by the beverage provider 320 to a provider of the dispenser control system 140 and/or the multi-site beverage-data system 302. For example, the provider of the multi-site beverage-data system 302 may charge the beverage provider 320 a penny for each ounce of beverage poured using the system described herein.

Example Beverage Reservation Process

Figure 6:
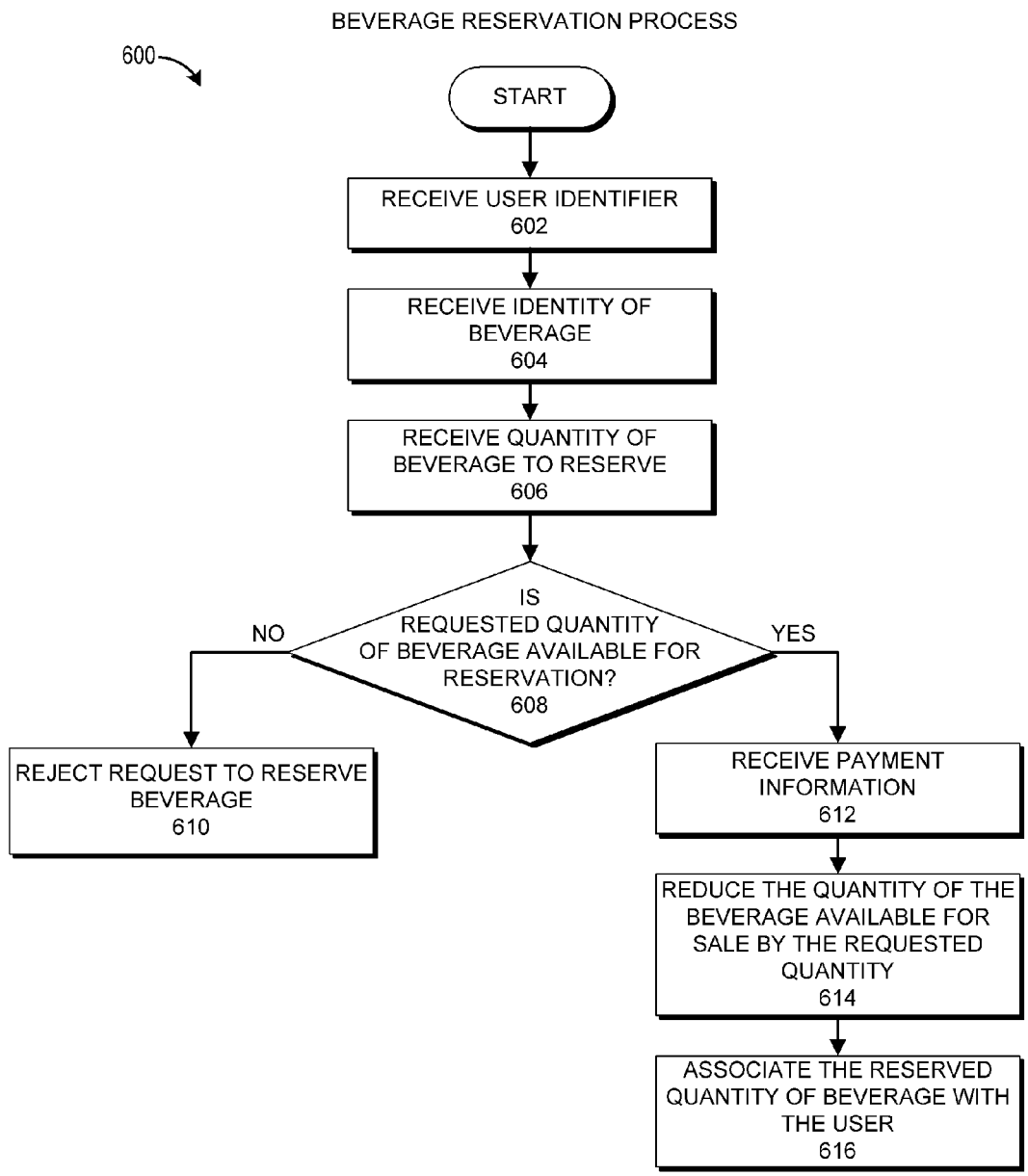
FIG. 6 is a flowchart illustrating an example of a beverage reservation process.

FIG. 6 illustrates an example of a beverage reservation process 600. The process 600 can be implemented, at least in part, by any system that can receive and process a reservation request to reserve a quantity of a beverage at a beverage provider. For example, the process 600, in whole or in part, can be implemented by the site-specific beverage tracking system 124, the inventory monitoring module 210, the consumption tracking module 206, the multi-site beverage-data system 302, and the social networking system 312, to name a few. Although any number of systems, in whole or in part, can implement the process 600, to simplify discussion, portions of the process 600 will be described with reference to particular systems. Further, to simplify discussion, the process 600 will be described assuming a user is attempting to reserve a quantity of beverage dispensed by the beverage dispenser 102 at the beverage provider 320. Depending on the embodiment, the method of FIG. 6 may include fewer or additional blocks and/or the blocks may be performed in an order different than is illustrated.

The process 600 begins at block 602 where, for example, the site-specific beverage tracking system 124 receives a user identifier as part of a request to reserve an amount of a beverage at a beverage provider 320. The user identifier may be a unique identifier associated with an account at the multi-site beverage-data system 302 and/or at the social networking system 312. In some cases, the block 602 includes receiving two user identifiers, one user identifier for the user attempting to reserve a quantity of a beverage, and one user identifier for the user capable of redeeming the reservation. In other words, in some cases, one user can reserve or purchase a quantity of the beverage for another user (e.g., a friend or other social connection). In some embodiments, the user purchasing the reservation may not have an account with the multi-site beverage-data system 302. In such cases, the user may be required to provide proof of age or to create an account with the multi-site beverage-data system 302 to prevent the purchase of alcoholic beverages by those below a particular age (e.g., 21 years old). Typically, the user identifier is received from an application, from a user accessing a webpage associated with the user at the social networking system 312, or from a user accessing a webpage associated with the beverage provider 320 at the multi-site beverage-data system 302 or social networking system 312.

In certain embodiments, a user may reserve a quantity of beverage at the beverage provider 320 while visiting the beverage provider 320. In such cases, the user identifier may be received by accessing a beverage-pour tracking device 126 associated with the user and determining the user's account based on the beverage-pour tracking device 126 identifier.

At block 604, the site-specific beverage tracking system 124 receives an identity of the beverage the user wishes to reserve. The site-specific beverage tracking system 124 receives a measure of the quantity of the beverage the user wishes to reserve at block 606. Typically, this measure will be in ounces or fluid ounces. However, other units of measure are possible, such as pints or cups.

At decision block 608, the inventory monitoring module 210 determines whether the requested quantity of beverage is available for reservation. This determination may be based by accessing inventory information at the inventory repository 202. Further, the determination may be based on the amount of the beverage in stock at the beverage provider 320 and whether the beverage provider 320 has authorized reservations of the beverage. In some cases, the beverage provider 320 may allocate a reservation portion of the total inventory of the beverage for reservations. In such cases, the determination made at decision block 608 may include determining whether unreserved beverage from the reservation portion of the beverage remains.

In some embodiments, the request received as part of the blocks 602-606 may be for a specific beverage at a specific beverage provider. In other cases, the request may be for a specific beverage within a specified distance from the user's location. In such cases, the decision block 608 may determine whether the beverage is available at any beverage provider within the area specified by the user. If the beverage is available for reservation within the specified areas, the locations of the providers can be presented to the user in, for example, increasing order of distance. The user can then select a specific beverage provider based on, for example, distance, price, quantity available for reservation, etc. Advantageously, in certain cases, the user can search for and reserve a measure of a difficult to find beverage, such as a special brew created in limited quantities.

If the requested quantity of beverage is unavailable, the site-specific beverage tracking system 124 rejects the request to reserve the beverage at block 610. Rejecting the reservation request can include informing the user of a reason for the rejection, such as not enough inventory available, reservation limits met, reservations not available for the selected beverage and/or location, etc. In some cases, the multi-site beverage-data system 302, using the data mining module 308, may present alternative locations and/or beverages that the user may be interested in based on information associated with the user's account at the multi-site beverage-data system 302 and/or the beverage reservation request.

If the requested quantity of beverage is available, the multi-site beverage-data system 302 and/or site-specific beverage tracking system 124 may receive payment information from the user. In some cases, the user may be charged for the reservation. In other cases, the payment information may be obtained to ensure payment upon fulfillment of the reservation, but the payment may not be charged until the reservation is fulfilled. In other embodiments, the block 612 may be optional.

At block 614, the site-specific beverage tracking system 124 reduces the quantity of the beverage available for sale at the beverage provider 320. Reducing the quantity of the beverage available for sale can include adjusting inventory information at the inventory repository 202 for the beverage. In some cases, reducing the quantity of the beverage available includes reducing the quantity of the beverage available for reservation, which in some cases may differ from the total quantity of the beverage available for sale.

The site-specific beverage tracking system 124 associates the reserved quantity of the beverage with the user at block 616. Associating the quantity of the beverage with the user can include updating an account of the user at the customer repository 204. In some cases, the reserved quantity is associated with an account of the user's at the multi-site beverage-data system 302. In such cases, the reservation information may be provided to the site-specific beverage tracking system 124 as part of the process 400 is performed when the user visits the beverage provider 320. In some embodiments, the reservation is associated with a different user than the user making the reservation. Reservations may remain until claimed or may be time-limited. Advantageously, in certain cases, by limiting the time a reservation remains in affect, a beverage provider 320 can more accurately manage inventory because unclaimed beverages do not need to be preserved or reserved indefinitely.

Example Reservation Reclamation Process

Figure 7:
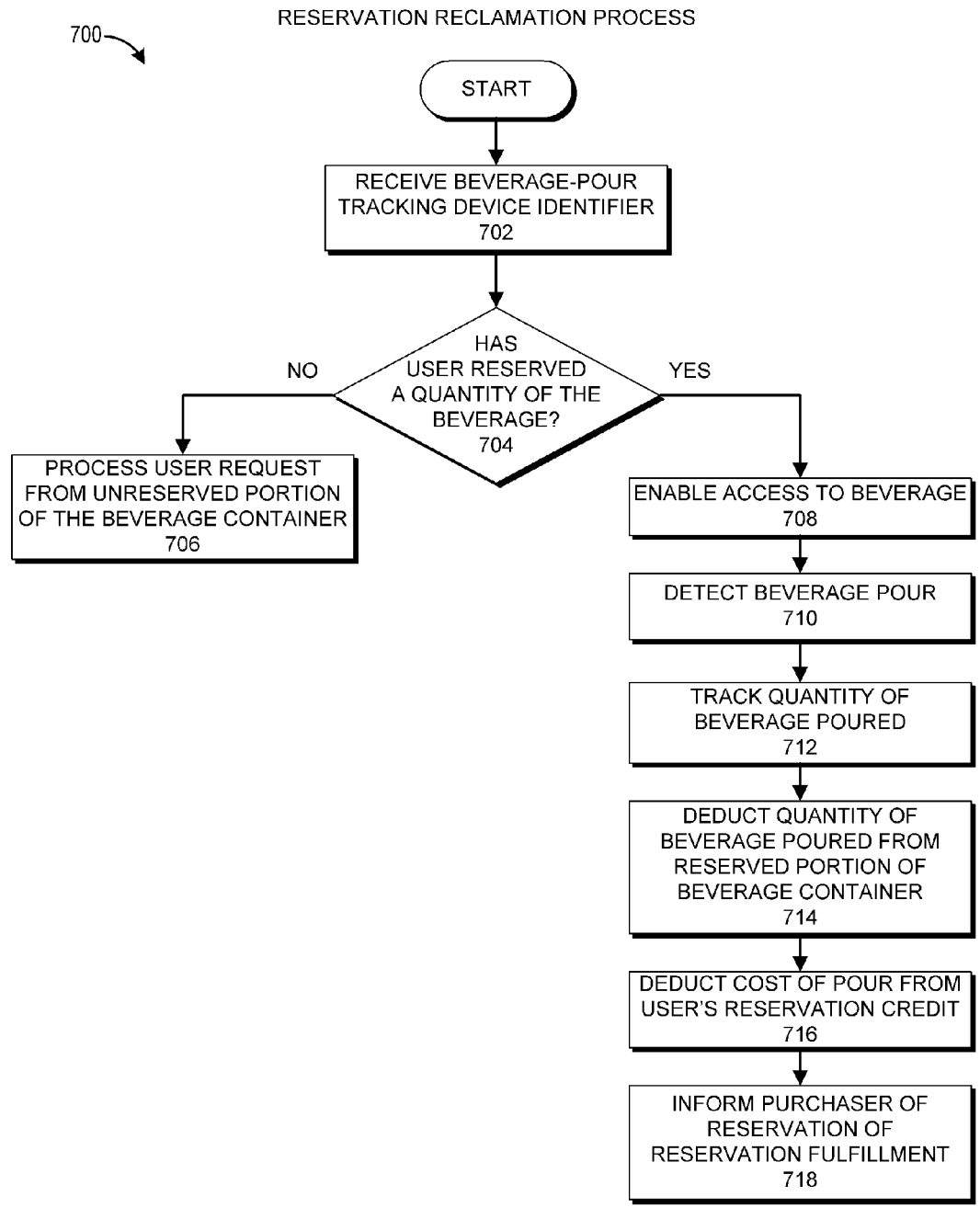
FIG. 7 is a flowchart illustrating an example of a reservation reclamation process.

FIG. 7 illustrates an example of a reservation reclamation process 700. The process 700 can be implemented, at least in part, by any system that can fulfill a reservation for a quantity of a beverage at a beverage provider. For example, the process 700, in whole or in part, can be implemented by the site-specific beverage tracking system 124, the consumption tracking module 206, the consumption control module 208, and the multi-site beverage-data system 302, to name a few. Although any number of systems, in whole or in part, can implement the process 700, to simplify discussion, portions of the process 700 will be described with reference to particular systems. Further, to simplify discussion, the process 700 will be described assuming a user is attempting to have a reservation for a quantity of beverage fulfilled by the beverage dispenser 102 at the beverage provider 320. In some embodiments, the process 700 can be performed in combination with one or both of the processes 400 and 500. Depending on the embodiment, the method of FIG. 7 may include fewer or additional blocks and/or the blocks may be performed in an order different than is illustrated.

The process 700 begins at block 702 where, for example, the consumption control module 208 of the site-specific beverage tracking system 124 receives a beverage-pour tracking device 126 identifier from a beverage-pour tracking device 126 associated with a user. In some embodiments, the block 702 can include some or all of the embodiments described above with respect to the block 502.

At decision block 704, the site-specific beverage tracking system 124 determines whether the user has reserved a quantity of the beverage contained in the container 104 of the beverage dispenser 102. Decision block 704 can include accessing information associated with the beverage-pour tracking device 126 identifier, which is associated with the user, at the customer repository 204. In some embodiments, beverage reservations associated with the user are identified during the process 400. In other embodiments, the reservations are stored at the customer repository 204 and are associated with the user and the beverage-pour tracking device 126 identifier when the user obtains the beverage-pour tracking device 126 as part of the process 400.

If the site-specific beverage tracking system 124 determines that the user has not reserved a quantity of the beverage dispensed by the beverage dispenser 102, the site-specific beverage tracking system 124, at block 706, processes the user request to access the beverage of the beverage dispenser 102 from an unreserved portion of the beverage container 104 and/or an unreserved portion of the beverage in stock at the beverage provider 320. The block 706 may include performing the process 500.

If the site-specific beverage tracking system 124 determines that the user has reserved a quantity of the beverage dispensed by the beverage dispenser 102, the consumption control module 208 enables access to the beverage at block 708. In some embodiments, the block 708 can include some or all of the embodiments described with respect to the block 516. At block 710, the controller system 120 detects when beverage is being poured from the beverage dispenser 102. In some embodiments, the block 710 can include some or all of the embodiments described with respect to the block 518.

At block 712, the controller system 120 tracks the quantity of beverage poured from the beverage dispenser 102. In some embodiments, the controller system 120 automatically prevents further beverage from being obtained from the beverage dispenser 102 by, for example, closing the valve 110 once the user has poured the entire quantity of the beverage reserved by the user, or for the user. The user may be informed by, for example, the user interface module 142 once the reservation has been fulfilled. In some instances, assuming additional unreserved beverage remains in the container 104, the user may be permitted to pour beyond the reserved amount of the beverage and can be charged the difference between the reserved quantity and the additional poured quantity, assuming the user has prepaid for the reserved quantity. In some embodiments, the block 712 can include some or all of the embodiments described with respect to the block 520.

The inventory monitoring module 210 deducts a measurement of the quantity of beverage poured from a measurement of the reserved portion of the beverage container 104 at an inventory repository 202 at block 714. In some embodiments, the block 714 can include deducting a measurement of the quantity of beverage poured from a measurement of the amount of beverage available at an inventory repository 202.

In some embodiments, the block 714 can include some or all of the embodiments described with respect to the block 522.

At block 716, the consumption tracking module 206 deducts the cost of the pour from the user's reservation credit. If the user exceeds the reservation amount, the block 716 may deduct the cost of the difference from the user's available credit. In some embodiments, the block 716 can include some or all of the embodiments described with respect to the block 526.

The multi-site beverage-data system 302 at block 718 may inform the purchaser of the reserved beverage that the reservation was fulfilled. Block 718 can include sending the purchaser an email, a text message, posting a message to a social networking page associated with the purchaser at a social networking website hosted by the social networking system 312, and the like. As previously indicated, in some cases the purchaser and the user claiming the reserved beverage amount may be the same person or may be different people, such as when the reservation is a gift from the purchaser to the user. In some embodiments, the block 718 is optional.

Example Beverage Special Notification Process

Figure 8:
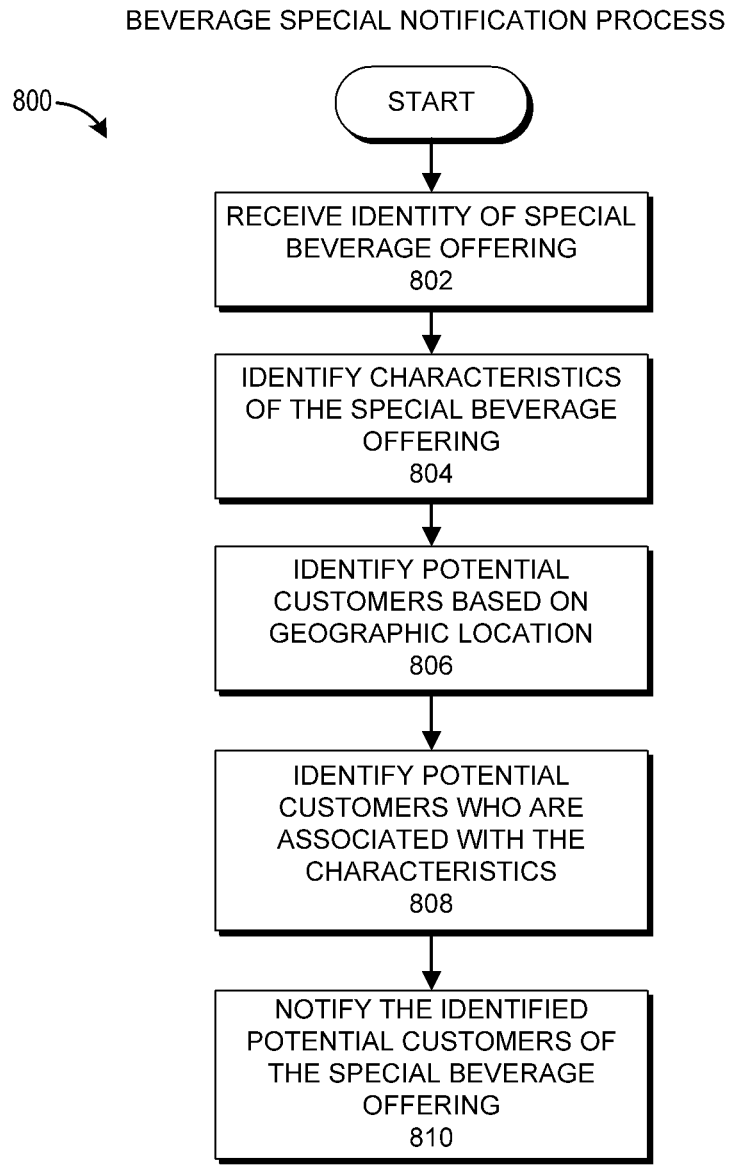
FIG. 8 is a flowchart illustrating an example of a beverage special notification process.

FIG. 8 illustrates an example of a beverage special notification process 800. The process 800 can be implemented, at least in part, by any system that can notify a user or potential customer of a beverage special offered by a beverage provider. For example, the process 800, in whole or in part, can be implemented by the site-specific beverage tracking system 124, the multi-site beverage-data system 302, the data mining module 308, the data collection module 310, and the social networking system 312, to name a few. Although any number of systems, in whole or in part, can implement the process 800, to simplify discussion, portions of the process 800 will be described with reference to particular systems. Further, to simplify discussion, the process 800 will be described assuming the beverage provider 320 is promoting a beverage special. Although the process 800 is described with respect to specials on beverages, the process 800 is not limited as such. In certain embodiments, the process 800 can be used to advertise products and/or specials on any type of product or service. For example, the process 800 can be used to advertise food specials, entertainment specials, and delivery services, to name a few. Depending on the embodiment, the method of FIG. 8 may include fewer or additional blocks and/or the blocks may be performed in an order different than is illustrated.

The process 800 begins at block 802 where, for example, the social networking system 312 receives an identity of a special beverage offering. The special beverage offering may be received from a site-specific beverage tracking system 124 (e.g., via the multi-site beverage-data system interface module 216), or from an employee of a beverage provider 320 interacting with the social networking system 312 using, for example, a client computing system (e.g., a laptop, desktop, smartphone, tablet, etc.). The special beverage offering can include offering a special or discounted price for a product or it can include an advertisement of a special product, which may or may not have a discounted price. Further, the special offer can be time-limited, inventory-limited, or may be offered until stated otherwise. For example, the special offering can include a price discount on domestic beers or the announcement that a craft beer or seasonal beverage is in stock. Further, in some cases, the social networking system 312 may receive an inventory update at the block 802, which may or may not be a special offering. For example, the social networking system 312 may receive information that a new keg of a particular craft beer has been installed in the beverage dispenser 102 or that the beverage provider has less than a threshold amount of a seasonal brew left in stock.

At block 804, the data mining module 308 may analyze the special beverage offering to identify characteristics associated with the offering. These characteristics can include price (e.g., price/fluid ounce), type of beverage, brand of the beverage, manufacturer of the beverage, location of manufacture of the beverage, percentage of alcohol of the beverage, location(s) that the special offering is available, uniqueness of the beverage (e.g., seasonal, limited production, no longer in production, etc.), and any other characteristic that can be associated with the special beverage offering.

The data mining module 308 identifies at block 806 potential customers who may be interested in the special beverage offering based on the geographic location of the beverage provider 320 location(s) and the geographic location of the potential customers. The geographic location of the potential customers can be residences of the potential customers. This information may be provided by users or determined from the identification used to generate accounts with the social networking system 312, the multi-site beverage-data system 302 and/or the site-specific beverage tracking system 124. Further, in some cases, the data mining module 308 can use check-in locations of users to identify potential customers. Potential customers may include users who have previously been customers of the beverage provider 320 and/or users who may not have previously visited or been customers of the beverage provider 320.

At block 808, the data mining module 308 identifies potential customers who are associated with, at least a subset of, the characteristics identified at the block 804. For example, suppose the special beverage offering is for a specialty craft brew of a dark woody ale with a hint of nutmeg spice that is available only in the winter. The characteristics identified at the block 804 may include: craft beer, seasonal—winter, ale, spiced, 7% alcohol by volume, domestic, and relatively expensive compared to the year's average beer price. The data mining module 308 may identify potential customers based on customers associated with at least a threshold percentage of the characteristics. For example, the data mining module 308 may identify a user as a potential customer if the user has a history of drinking ales, craft beers, and domestic beers. A user who drinks lagers and is identified by the data mining module 308 as price conscious may not be selected by the data mining module 308 for the special beverage offering. In some embodiments, at least some of the characteristics associated with the special beverage offering and/or the potential customers may be weighted. For example, the characteristic of seasonal beer, ale, and spiced may be weighted higher than domestic.

As with the block 806, the potential customers of the block 808 can include users who are associated with the bar (e.g., users who visited the bar a threshold number of times), or users who have not been to the bar, but whose characteristics have been identified from visits to other beverage providers who use the systems described herein or from using the social networking system 312. In some embodiments, one or more of the blocks 804, 806, and 808 may be optional. For example, in some cases, the special beverage offering may be made available to all users of the social networking system 312 regardless of characteristics of the special beverage offering or of the users.

At block 810, the social networking system 312 notifies the identified potential customers of the special beverage offering. In some cases, notifying the potential customers can include posting notice of the special beverage offering on the profile page of the potential customers at the social networking website provided by the social networking system 312 and/or on the profile page of the beverage provider 320. Alternatively, or in addition, notifying the potential customers can include emailing, texting, instant message, or otherwise informing the potential customers of the special beverage offering.

In some embodiments, the process 800 can be used to determine the number of potential customers that may be interested in a special beverage offering. The beverage provider 320 can then determine whether to make the special beverage offering available based on the number of potential customers identified by the data mining module 308. In such cases, the blocks 802-808 may be performed one or more times without performing the block 810. The social networking system 312 can then perform the block 810 if an employee of the beverage provider 320 confirms the special beverage offering by, for example, clicking submit. In some embodiments, the employee can determine the count of potential customers by querying a repository (e.g., the customer repository 304) of data stored at the multi-site beverage-data system 302 using a query webpage, such as the one discussed below with respect to FIG. 11.

Example Profile Page for a Customer

FIG. 9 illustrates one non-limiting example of a profile page 900 for a customer, John Smyth, at a beverage-based social networking site or a social networking application, which may or may not be a website. The beverage-based social networking website may be provided by the multi-site beverage-data system 302 via, for example, the social networking system 312. The social networking website may be accessed by a web browser from a client, such as one of the computing clients 342. In some cases, the social networking website may be accessed via an application or app.

The profile page 900 can include any type of customer information provided by the customer and/or derived by the data mining module 308 based on the customer's visits and/or purchases at one or more beverage providers (e.g., the beverage provider 320). For example, the profile page 900 can include a profile and demographic data section 902. This section can include the user's name, gender, age, height, weight, residence, etc. At least some of this information may be obtained from an identification, such as a government identification, used to subscribe to the social networking website.

A friends panel 904 may include a list of the user's connections. Generally, these will include other users. However, in some cases, the connections may also include beverage providers. Further, the friends panel 904 can indicate which connections are online (e.g., the darkened circles) and which are offline (e.g., the non-darkened circles) enabling the user to instant message with the online connections via an instant messaging screen or panel (not shown).

The profile page 900 may also include a favorite hangouts panel 906, which can include a list of beverage providers. These beverage provides may be locations that the customer has indicated as a favorite beverage provider. In other cases, the data mining module 308 may determine the favorite hangouts based on customer check-ins and/or customer information provided by the beverage providers.

As described with respect to FIG. 6, a user can reserve a quantity of a beverage at a beverage provider. The reservations display panel 908 can display reservations made by the user and/or gifted to the user by another user. In cases where the user decides to reserve a beverage, the user can use the reservations panel 910 to reserve the beverage. As illustrated in FIG. 9, the user can select a beverage provider, a beverage, and a quantity of the beverage to reserve. Further, the reservation panel 910 can present a user with the status of a reservation, such as whether the reservation was accepted. In some cases, the reservation panel 910 may also inform the user whether a beverage can be reserved before the user submits the reservation request. This information may be obtained by accessing information associated with the beverage provider from the beverage provider repository 306 and/or the inventory repository 202. In some implementations, the reservations panel 910 may also include a field for selecting another user (e.g., a connection) thereby enabling the user to gift the reservation. In some embodiments, other users can use the reservation panel 910 on the profile page 900 enabling the other users to gift a reservation to the user associated with the profile page 900.

The reservation can be submitted by clicking a reserve button included in the reservation panel 910. Payment information may be obtained by accessing the customer repository 304 or a customer repository 204 associated with the beverage provider. Alternatively, a payment window (not shown) may be presented to the user to obtain payment information. In some cases, the payment may be deducted from existing credits associated with the user. The user's existing credit may be displayed in a credits panel 912. In other cases, payment information is not obtained and payment may be made when the user visits the beverage provider.

In addition to reserving beverages, the user can purchase a beverage as a gift for a connection using the beverage gifting panel 914. In some cases, the gift can be for any user, particularly when beverages may include non-alcoholic drinks. However, to ensure that the user to receive the gift is old enough to legally consume alcohol, the ability to gift a beverage is generally limited to providing a gift to registered users who have provided identification when registering with the multi-site beverage-data system 302 or social networking system 312. In some cases, the gifts and/or reservations may be for non-beverage products, such as food.

In one example of the gifting panel 914, the gifting panel 914 may include a field for identifying the user to receive the gift, the location where the gift may be redeemed, the beverage to be gifted, the quantity of the beverage, whether the gift is anonymous, and the price of the gift. In some cases, as illustrated, the gift may be for any beverage. Further, the gift may be limited to a quantity and/or a price for the beverage. The location where the gift can be redeemed may be limited to a single location or to multiple locations associated with a beverage provider. In other cases, the gift may be redeemed at any participating beverage provider. In certain embodiments, other users may use the gifting panel 914 to provide a gift to the user associated with the profile page 900. In such cases, the friend field of the gifting panel 914 can be left blank or may identify the user of the profile page 900. Alternatively, the friend field of the gifting panel 914 may identify the friend purchasing the gift.

A specials panel 916 can display to the user any specials that may be offered by a beverage provider. In some cases, the specials panel 916 may only display specials from the user's favorite hangouts. In other cases, the specials may be from any beverage provider. As described with respect to FIG. 8, in some cases, the specials displayed in the specials panel 916 are special beverage offerings whose characteristics satisfy at least a threshold of characteristics associated with the user.

Activity panel 918 can display activity by the user or by connections of the user directed at the user. For example, connections of the user may post messages on the user's profile. As a second example, activity panel 918 can indicate that the user acknowledged, or give a thumbs up, to a post by another user. Further, links to other profiles and/or to websites posted by the user can be displayed in the activity panel 918.

In ratings panel 920, user ratings of beverages as rated by the user can be displayed. In some cases, the ratings may be submitted using the user interface module 142 at a beverage provider. Alternatively, or in addition, the ratings may be submitted via the ratings panel 920. In some instances, the ratings panel 920 may present the user with beverages to rate. The beverages presented may be random, may be based on beverages the user previously rated, and/or may be beverages the user has poured as identified based on information stored at the multi-site beverage-data system 302 (e.g., in the customer repository 304.).

When users visit beverage providers, they can check-in using an application on their mobile computing device. These check-ins can be displayed in the check-ins panel 922. In other cases, the check-ins may occur automatically when the user obtains a beverage-pour tracking device 126 at the beverage provider 320. In some embodiments, the check-ins panel 922 can also display each pour by the user.

Using a search panel 924, the user can search for a beverage. In addition to entering key terms to search for the beverage, the user can narrow the search results be selecting a beverage type (e.g., beer in the example of FIG. 9). The results of the search can be presented in the search panel 924 or in a separate results window (not shown).

A number of panels and display elements have been described for the profile page 900. In some cases, additional and/or fewer display elements and information may be accessed on the profile page 900. In some instances, one version of the profile page 900 may be displayed to the user associated with the profile page 900, a second version of the profile page may be displayed to the user's connections, and a third version may be displayed to users who are not connections or do not have an account with the social networking website. For example, the credits panel 912 may be displayed only to the user associated with the profile page 900 and the friends panel 904 may be hidden from users who are not connected to the user on the social networking website.

Example Profile Page for a Beverage Provider

FIG. 10 illustrates an example profile page 1000 for a beverage provider, Bar None, at a beverage-based social networking site or a social networking application, such as that previously described above, for example, with respect to FIG. 9.

The profile page 1000 can include any type of beverage provider information provided by the beverage provider and/or derived by the data mining module 308 based on information stored in the beverage provider repository 306 and/or the inventory repository 202 of the beverage provider. For example, the profile page 1000 can include a business information section 1002. This section can include the beverage provider's name, address, hours of operation, etc.

A friends panel 1004 may include a list of the beverage provider's connections. Generally, these will include users or customers of the beverage provider. For example, users who check-in at the beverage provider, and who, in some cases, may be listed in the check-ins panel 1020. However, in some cases, the connections may also include other beverage providers. Further, in some cases, the friends panel 1004 may include any user who has indicated they like the beverage provider, such as through the use of a thumbs up or like button. In some cases, the beverage provider needs to confirm a connection before the connection is listed as a friend in the friends panel 1004. In other cases, any user who likes the beverage provider, or indicates the beverage provider is a hangout or friend is automatically listed as a friend or connection in the friends panel 1004. Further, the friends panel 1004 can indicate which connections are online (e.g., the darkened circles) and which are offline (e.g., the non-darkened circles) enabling representatives or employees of the beverage provider to interact with the beverage provider's friends or followers via, for example, an instant messaging screen or panel (not shown).

The beverage provider associated with the profile 1000 can list its drink menu in the drink menu panel 1006. In some cases, the beverage provider can lists its food menu or other offerings in the drink menu panel 1006. Alternatively, a separate section (not shown) may be used to provide a non-drink menu.

As described with respect to FIG. 6 and FIG. 9, a user can reserve a quantity of a beverage at the beverage provider. A user can use the reservations panel 1008 to reserve a beverage. As illustrated in FIG. 10, the user can select a beverage and a quantity of the beverage to reserve. Further, in cases where the beverage provider has multiple locations, the user can select the location where the user desires to reserve the beverage. In addition, the reservation panel 1008 can present a user with the status of a reservation, such as whether the reservation was accepted. In some cases, the reservation panel 1008 may also inform the user whether a beverage can be reserved before the user submits the reservation request. This information may be obtained by accessing information associated with the beverage provider from the beverage provider repository 306 and/or the inventory repository 202. In some implementations, the reservations panel 1008 may also include a field for selecting another user (e.g., a connection) thereby enabling the user to gift the reservation. Generally, the user reserving the beverage can be identified via login information. However, in some cases, the reservation panel 1008 may include a field for the user to enter his or her identity.

The reservation can be submitted by clicking a reserve button included in the reservation panel 1008. Payment information may be obtained by accessing the customer repository 304 or a customer repository 204 associated with the beverage provider. Alternatively, a payment window (not shown) may be presented to the user to obtain payment information. In some cases, the payment may be deducted from existing credits associated with the user. In other cases, payment information is not obtained and payment may be made when the user visits the beverage provider.

In addition to reserving beverages, the user can purchase a beverage as a gift for a connection or other user using the beverage gifting panel 1010. In some cases, the gift can be for any user, particularly when beverages may include non-alcoholic drinks. However, to ensure that the user to receive the gift is old enough to legally consume alcohol, gifts are generally limited to registered users who have provided identification when registering with the multi-site beverage-data system 302 or social networking system 312. In some cases, the gifts and/or reservations may be for non-beverage products, such as food.

In one example of the gifting panel 1010, the gifting panel 1010 may include a field for identifying the user to receive the gift, the location where the gift may be redeemed, the beverage to be gifted, the quantity of the beverage, whether the gift is anonymous, and the price of the gift. In some cases, the gift may be for any beverage. Further, the gift may be limited to a quantity and/or a price with or without selecting a specific beverage to gift. The location where the gift can be redeemed may be limited to a single location or to multiple locations associated with a beverage provider.

The beverage provider's profile page 1000 may also include an inventory panel 1012. The inventory panel 1012 can display the amount of beverage in stock for different beverages thereby enabling, in some cases, a user to determine whether their favorite beverage is in stock. Further, the inventory panel 1012 may indicate whether a beverage may be reserved. Moreover, the inventory panel 1012 may indicate whether those beverages that may be reserved still have inventory that may be reserved. In some cases, the quantity of beverage that may be reserved is equal to the total inventory for that beverage. In other cases, the quantity of beverage that may be reserved is less than the total inventory for the beverage. In such cases, the inventory panel 1012 may also indicate whether there is non-reservable inventory available for beverages that have sold out of all reservable inventory. In some embodiments, the inventory panel 1012 may be combined with the drink menu 1006. For example, the inventory panel 1012 may include prices for the drinks. The information included in the inventory panel 1012 may be provided by the beverage provider and/or obtained by accessing one or more of the beverage provider repository 306 and the inventory repository 202.

Specials offered by the beverage provider may be listed in the specials panel 1014. Further, the identity of kegs or beverage containers that have been opened or tapped within a given time period (e.g., one hour) may be posted in a recently tapped panel 1016. Advantageously, in certain embodiments, by posting the recently tapped kegs information in the recently tapped panel 1016, a user who would prefer to pour from a fresh keg can identify newly tapped kegs thereby providing incentive for the user to make a purchase. In addition, the recently tapped kegs information can be mined by the data mining module 308 to identify popular beverages. In some embodiments, a list of popular beverages for a time period (e.g., for the night, for the week, etc.) can be posted on a popular beverages list (not shown). The specials as well as the recently tapped kegs information may be posted by the beverage provider or accessed from the beverage provider repository 306 and/or the inventory repository 202.

The upcoming events panel 1018 can display any events that the beverage provider desires to advertise to customers or potential customers who visit the beverage provider's profile page 1000. These events can include both events at the beverage provider as well as other events the beverage provider may want to advertise, such as an upcoming open house at a local brewer.

As mentioned above, customers who check-in may be listed in the check-ins panel 1020. The check-ins panel may list customers how check-in using an application or by visiting the profile page 1000. In other cases, the profile page 1000 may list all customers who obtain a beverage-pour tracking device 126 at the beverage provider as a check-in.

As with the profile page 900, a number of panels and display elements have been described for the profile page 1000. In some cases, additional and/or fewer display elements and information may be accessed on the profile page 1000. In some instances, one version of the profile page 1000 may be displayed to the beverage provider associated with the profile page 1000, a second version of the profile page may be displayed to potential customers who visit the profile page 1000. In some embodiments, a user may opt out of having their information (e.g., check-ins) displayed on the beverage provider's profile page 1000.

Example Query Page

FIG. 11 illustrates an example of a query page 1100 for searching data stored at a multi-site beverage-data system 302 Generally, the query page 1100 can be used to identify potential customers based on characteristics or preferences associated with the users whose information is available in the repositories of the multi-site beverage-data system 302 and/or the site-specific beverage tracking system 124. Although the example query page 1100 illustrates a search for potential customers based on beverage preferences, in some embodiments, the query page 1100 may be used to identify potential customers based on preferences with respect to other products, such as food items. Moreover, although the query page 1100 is described with respect to a user (e.g., an employee) of a beverage provider, in some cases, the query page 1100 can be used by employees of beverage manufacturers or suppliers, or by any user who wishes to identify users associated with particular characteristics.

The query page 1100 may be accessed via a web browser or may be part of an application that can communicate with the multi-site beverage-data system 302 and/or the repositories of the multi-site beverage-data system 302. In some cases, the query page 1100 may also be used to access data associated with the site-specific beverage tracking system 124 and/or its repositories. In certain embodiments, the query page 1100 can be used by a beverage provider to help develop specials that may be presented to customers or potential customers using, for example, the process 800. For instance, an employee of a beverage provider (e.g., the beverage provider 320) may enter details associated with a planned special into the query page 1100 as a set of characteristics. Based on the number of potential customers identified by the query page 1100, the employee can decide whether to post the special or to modify the special. In some embodiments, an automated system may develop the special and/or may decide whether to post the special based on the characteristics of the special and the number of potential customers identified.

A user can search for potential customers based on one or more characteristics. In some cases, the user can supply the characteristics using the search characteristics panels 1102, 1104, and 1106. In other cases, a system that hosts and/or supports the query page 1100, (e.g., the multi-site beverage-data system 302) may derive the characteristics based on a potential beverage special supplied by the user or generated by the multi-site beverage-data system 302.

Each of the search characteristic panels 1102, 1104, and 1106 may be used for supplying a search characteristic for identifying users, or potential customers. Additional search characteristics can be added by selecting the add button 1108. When the add button 1108 is selected, an additional search characteristic panel can be added to the query page 1100. Further, the number of search characteristics can be reduced by selecting the remove button 1110. When one of the remove buttons 1110 is selected, the search characteristic panel associated with the remove button can be deleted or removed from the query page 1100. A search characteristics can be selected from the characteristic drop down boxes 1112 included in the search characteristic panels 1102, 1104, and 1106. These drop down boxes can include any characteristic that can be identified from a customer's beverage preferences including, for example, beverage type, beverage brand, alcohol content, beverage manufacturer, manufacturer location, etc. For example, the search characteristic panel 1102 identifies a beer type, the search characteristic panel 1104 identifies a manufacture location for a beverage as an import from either Europe or Japan, and the search characteristic panel 1106 identifies a range of alcohol content for a beverage. As with the search characteristic panels, one or more regions can be added to the manufacture location characteristic by selecting the add button 1114. Further, a region can be removed by selecting a remove button 1116.

In addition to the one or more search characteristic panels for supplying one or more search characteristics, the query page 1100 can include a geographic area panel 1120 for identifying potential customers who live within a particular distance of a supplied address. Advantageously, in certain embodiments, a beverage provider (or an employee thereof) can identify the number of potential customers who live within a particular distance of the beverage provider's location by using the geographic area panel 1120. In some cases, a user can search for all users regardless of distance to a location by leaving the fields of the geographic area panel 1120 blank.

To obtain the search results from the query entered into the query page 1100, a user can select the search button 1122. The result of the query can be presented in the results panel 1130. In other embodiments, the result may by presented in a separate window. Generally, the result of the query identifies potential customers based on the supplied set of characteristics. As described previously, potential customers can include customers who match the characteristics supplied via the search characteristics panels and, in some cases, the geographic area panel 1120. Further, as previously described, in some cases, potential customers can include customers that match at least a threshold percentage of the characteristics. Although not illustrated, in some cases, the query page 1100 can include a field for associating each of the characteristics supplied with a different weight, including the geographic area panel 1120.

The results panel 1130 can include any type of information that may relate to the identified potential customers. For example, the results panel 1130 may display a count of the total number of potential customers who match the supplied set of characteristics, or who satisfy at least a threshold number or percentage of the characteristics. As a second example, the results panel 1130 may display the number of potential customers who have previously been customers either ever, or within a specific time period (e.g., the past month, the past year, etc.). In addition, the results panel 1130 may include the average amount of money spent by the potential matching customers over a time period (e.g., per visit, per month, etc.). Generally, the average amount spent is based on visits to beverage providers using at least some of the embodiments described herein. However, in some cases, the average amount spent may be based on information from additional sources, such as user-supplied information, credit card records, etc.

In certain embodiments, a user may view demographic information about the matching customers. For example, a breakdown of the gender, age, location and any other information that can be determined by the data mining module 308 may be presented in the results panel 1130. In addition, the results panel 1130 may, in some cases, identify one or more beverages that one or more potential customers have previously poured which led the potential customers to be included in the results. Generally, the user is not presented with individual user profiles in response to the query. However, in some cases, a user may view individual profiles for potential customers who match the supplied characteristics.

In addition to presenting the results of the search, the results panel 1130 can include fields for submitting notice of a beverage special, or any other type of special offer, to the identified potential customers. In some embodiments, a separate window or panel may be used for posting the special. The results panel 1130 can include a specials field 1132 for entering the special offer. In addition, the results panel 1130 can include a specials target input mechanism 1134 (e.g., checkboxes) for identifying which users are to receive notice of the special. For example, an employee or owner of a beverage provider may have the special advertised to all potential customers, those who have previously visited the beverage provider, those who have previously visited the beverage provider within a specific time period, potential customers of a particular demographic (e.g., women), etc. Further, the results panel 1130 can include a posting method input mechanism 1136 for identifying how potential customers are to be informed of the special. A user can decide to send the special via one or more mechanisms including, for example, email, text message, by posting on profile pages of potential customers, etc. Further, the user can have the special offer posted on the profile page of the beverage provider that is offering the special. In order to post the special via the selected mechanisms, the user can select the post button 1138 or any other user interface mechanism that can indicate a desire to advertise the special offer.

Terminology

A number of computing systems have been described throughout this disclosure. The descriptions of these systems are not intended to limit the teachings or applicability of this disclosure. For example, the user systems described herein can generally include any computing device(s), such as desktops, laptops, video game platforms, television set-top boxes, televisions (e.g., internet TVs), computerized appliances, and wireless mobile devices (e.g. smart phones, PDAs, tablets, or the like), to name a few. Further, it is possible for the user systems described herein to be different types of devices, to include different applications, or to otherwise be configured differently. In addition, the user systems described herein can include any type of operating system ("OS"). For example, the mobile computing systems described herein can implement an Android™ OS, a Windows® OS, a Mac® OS, a Linux or Unix-based OS, or the like.

Further, the processing of the various components of the illustrated systems can be distributed across multiple machines, networks, and other computing resources. In addition, two or more components of a system can be combined into fewer components. For example, the various systems illustrated as part of the multi-site beverage-data system 302 can be distributed across multiple computing systems, or combined into a single computing system. Similarly, the various systems illustrates as part of the site-specific beverage tracking system 124 can be distributed across multiple computing systems, or combined into a single computing system. Further, various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Depending on the embodiment, certain acts, events, or functions of any of the algorithms described herein can be performed in a different sequence, can be added, merged, or left out all together (e.g., not all described acts or events are necessary for the practice of the algorithms). For example, in some cases, the block 416 may be performed before the block 414 in the process 400. Moreover, in certain embodiments, acts or events can be performed concurrently, e.g., through multi-threaded processing, interrupt processing, or multiple processors or processor cores or on other parallel architectures, rather than sequentially. For example, in some cases, the block 416 and the block 414 may be performed in parallel.

Each of the various illustrated systems may be implemented as a computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state. Further, one or more of the described methods may be stored on computer-readable media, including non-transitory physical computer readable media. Each process described may be implemented by one or more computing devices, such as one or more physical servers programmed with associated server code.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method for tracking beverage pours, the method comprising:
   by one or more computer hardware components comprising one or more processors:
      accessing an identification associated with a customer of a first beverage provider;
      determining customer information about the customer based on the accessed identification;
      generating a unique customer identifier corresponding to the customer based on the accessed identification;
      associating the customer with a customer account at a site-specific beverage tracking system based at least in part on the unique customer identifier;
      associating the customer with a beverage-pour tracking device based on the unique customer identifier and a unique tracking device identifier associated with the beverage-pour tracking device, the beverage-pour tracking device storing information for identifying the customer account associated with the customer at the site-specific beverage tracking system;
      determining whether the beverage-pour tracking device is within a threshold distance from a first activator associated with a first beverage dispenser of a plurality of beverage dispensers, wherein each beverage dispenser of the plurality of beverage dispensers is associated with a separate activator;
      in response to determining that the beverage-pour tracking device is within the threshold distance from the first activator, identifying the customer based on the information stored on the beverage-pour tracking device;
      determining whether a measure of an amount of a first beverage available at the first beverage provider satisfies a minimum available beverage threshold, wherein the minimum available beverage threshold comprises a dynamic threshold based on a rate of consumption at the first beverage provider over a specified period of time; and
      in response to determining that the measure of the amount of the first beverage available satisfies the minimum available beverage threshold, activating the first beverage dispenser thereby enabling the customer to obtain access to the first beverage.

2. The method of claim 1, further comprising, by the one or more computer hardware components, after activating the first beverage dispenser, determining pour information indicating a quantity of the first beverage poured from the first beverage dispenser.

3. The method of claim 2, further comprising, by the one or more computer hardware components, updating the customer account at the site-specific beverage-tracking system based, at least in part, on the pour information.

4. The method of claim 2, further comprising, by the one or more computer hardware components:
   reducing the measure of the amount of the first beverage available based on the quantity of the beverage poured;
   determining if the measure of the amount of the beverage available does not satisfy an available inventory threshold; and
   in response to determining that the measure of the amount of the beverage available does not satisfy the available inventory threshold, at least one of:
      alerting an employee to obtain additional inventory of the beverage; and
      initiating a purchase of additional inventory of the beverage.

5. The method of claim 4, wherein the available inventory threshold and the minimum available beverage threshold are the same.

6. The method of claim 1, wherein the minimum available beverage threshold comprises a combination of an inventory minimum threshold and a reserved beverage quantity.

7. The method of claim 1, further comprising, by the one or more computer hardware components:
   receiving a reservation request for a reservation quantity of the first beverage, the reservation request associated with a second account;
   determining whether the measure of the amount of the first beverage in stock is sufficient to satisfy the reservation request; and in response to determining that the measure of the amount of the first beverage in stock is sufficient to satisfy the reservation request, reserving the reservation quantity of the first beverage for a second customer associated with the second account and adjusting the minimum available beverage threshold based on the reservation quantity.

8. The method of claim 7, further comprising, by the one or more computer hardware components:
in response to determining that the measure of the amount of the first beverage in stock is insufficient to satisfy the reservation request:
rejecting the reservation request to reserve the first beverage; and
providing, to the second customer, at least one suggested alternative beverage based on information about the second user.

9. The method of claim 1, further comprising, by the one or more computer hardware components, updating a social networking page associated with the customer.

10. The method of claim 9, wherein updating the social networking page comprises updating at least one of the following: a location check-in, a drink rating, a favorite beverage provider, a favorite beverage type, a check-in reward credit, and a reclaimed beverage offer.

11. The method of claim 1, wherein the measure of the amount of the first beverage available comprises one or more of a measure of the amount of the first beverage at the first beverage provider and a measure of the amount of the first beverage in the first beverage dispenser.

12. The method of claim 1, further comprising, by the one or more computer hardware components:
determining a maximum pour quantity associated with the customer based at least in part on weight, build and gender information about the customer;
determining whether the customer has exceeded the maximum pour quantity based on the determined pour information; and
in response to determining that the customer has exceeded the maximum pour quantity, deactivating the first beverage dispenser to prevent the customer from further accessing the first beverage.

13. The method of claim 12, wherein the maximum pour quantity associated with the customer is based at least in part on a total amount of beverages poured by the customer per quantity of time.

14. The method of claim 1, wherein the beverage-pour tracking device comprises a Radio-Frequency Identification (RFID) device.

15. The method of claim 1, wherein the beverage-pour tracking device comprises a bracelet with a Radio-Frequency Identification (RFID) device that is configured to be positioned within the threshold distance from the first activator when the customer engages an activation mechanism associated with the first beverage dispenser.

16. The method of claim 1, wherein the beverage-pour tracking device comprises a Near-Field Communication (NFC) device.

17. The method of claim 1, further comprising presenting, by the one or more computer hardware components, information about the first beverage via a user interface.

18. The method of claim 17, wherein the information further comprises at least one of: the identity of the type of beverage of the first beverage, information about where the first beverage was produced, trivia about the first beverage, quantity of the first beverage remaining, customer ratings for the first beverage, tips on how to best pour the first beverage, and a list of recommended foods to pair with the beverage.

* * * * *